(12) United States Patent
Mixter et al.

(10) Patent No.: US 11,614,794 B2
(45) Date of Patent: Mar. 28, 2023

(54) ADAPTING AUTOMATED ASSISTANT BASED ON DETECTED MOUTH MOVEMENT AND/OR GAZE

(71) Applicant: Google LLC, Mountain View, CA (US)

(72) Inventors: Kenneth Mixter, Los Altos Hills, CA (US); Yuan Yuan, Redwood City, CA (US); Tuan Nguyen, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/606,030

(22) PCT Filed: May 4, 2018

(86) PCT No.: PCT/US2018/031170
§ 371 (c)(1),
(2) Date: Oct. 17, 2019

(87) PCT Pub. No.: WO2019/212569
PCT Pub. Date: Nov. 7, 2019

(65) Prior Publication Data
US 2020/0342223 A1 Oct. 29, 2020

(51) Int. Cl.
G06F 3/16 (2006.01)
G06F 3/01 (2006.01)
(Continued)

(52) U.S. Cl.
CPC .............. *G06F 3/011* (2013.01); *G06F 3/167* (2013.01); *G06V 40/164* (2022.01); *G06V 40/19* (2022.01)

(58) Field of Classification Search
CPC ............ G06K 9/00604; G06K 9/00241; G06F 3/011; G06F 3/167
See application file for complete search history.

(56) References Cited

U.S. PATENT DOCUMENTS 7,028,269 B1     4/2006  Cohen
8,885,882 B1 *  11/2014  Yin ................... G06K 9/00248
                                                        382/103
(Continued)

FOREIGN PATENT DOCUMENTS

EP     2891954 A1    7/2015
EP     2966644 A2    1/2016
(Continued)

OTHER PUBLICATIONS

European Patent Office: Intention To Grant issued in Application No. 18727930.2 dated Oct. 2, 2020.
(Continued)

*Primary Examiner* — Jordany Nunez
(74) *Attorney, Agent, or Firm* — Gray Ice Higdon

(57) ABSTRACT

Adapting an automated assistant based on detecting: movement of a mouth of a user; and/or that a gaze of the user is directed at an assistant device that provides an automated assistant interface (graphical and/or audible) of the automated assistant. The detecting of the mouth movement and/or the directed gaze can be based on processing of vision data from one or more vision components associated with the assistant device, such as a camera incorporated in the assistant device. The mouth movement that is detected can be movement that is indicative of a user (to whom the mouth belongs) speaking.

20 Claims, 8 Drawing Sheets

(51) Int. Cl.
*G06F 3/0481* (2022.01)
*G06V 40/19* (2022.01)
*G06V 40/16* (2022.01)

(56) References Cited

U.S. PATENT DOCUMENTS

| | | | |
|---|---|---|---|
| 9,250,703 B2* | 2/2016 | Hernandez-Abrego | A63F 13/10 |
| 9,263,044 B1* | 2/2016 | Cassidy | G10L 21/0208 |
| 9,423,870 B2* | 8/2016 | Teller | G06F 3/013 |
| 9,691,411 B2* | 6/2017 | Scherer | G10L 17/26 |
| 9,832,452 B1 | 11/2017 | Fotland et al. | |
| 9,939,896 B2* | 4/2018 | Teller | G10L 15/22 |
| 10,075,491 B2* | 9/2018 | Smus | G06F 3/167 |
| 10,149,958 B1* | 12/2018 | Tran | G06V 40/19 |
| 10,156,900 B2* | 12/2018 | Publicover | G06F 3/013 |
| 10,366,691 B2* | 7/2019 | Rochford | G06F 3/167 |
| 10,423,225 B2* | 9/2019 | Suk | G06F 3/167 |
| 10,540,015 B2* | 1/2020 | Li | G06F 3/167 |
| 10,636,217 B2* | 4/2020 | Osman | G06T 13/40 |
| 10,726,521 B2* | 7/2020 | Leong | G06T 3/608 |
| 10,768,693 B2* | 9/2020 | Powderly | G06F 3/017 |
| 10,853,911 B2* | 12/2020 | Leong | G06T 3/0093 |
| 10,890,969 B2* | 1/2021 | Yuan | G06F 3/013 |
| 11,135,396 B2* | 10/2021 | Tran | G16H 20/30 |
| 2002/0135618 A1* | 9/2002 | Maes | G10L 15/24, 715/767 |
| 2004/0193413 A1 | 9/2004 | Wilson et al. | |
| 2005/0033571 A1 | 2/2005 | Huang | |
| 2006/0192775 A1 | 8/2006 | Nicholson et al. | |
| 2012/0062729 A1 | 3/2012 | Hart et al. | |
| 2012/0295708 A1 | 11/2012 | Hernandez-Abrego et al. | |
| 2013/0144616 A1 | 6/2013 | Bangalore | |
| 2013/0144629 A1 | 6/2013 | Johnston et al. | |
| 2013/0304479 A1* | 11/2013 | Teller | G06F 3/0481, 704/275 |
| 2014/0016837 A1 | 1/2014 | Nechyba et al. | |
| 2014/0062862 A1 | 3/2014 | Yamashita | |
| 2014/0149754 A1 | 5/2014 | Silva et al. | |
| 2014/0247208 A1 | 9/2014 | Henderek et al. | |
| 2014/0306874 A1 | 10/2014 | Finocchio et al. | |
| 2014/0337949 A1 | 11/2014 | Hoyos | |
| 2014/0361973 A1 | 12/2014 | Raux et al. | |
| 2015/0033130 A1 | 1/2015 | Scheessele | |
| 2015/0193005 A1 | 7/2015 | Di Censo et al. | |
| 2016/0011853 A1 | 1/2016 | Rogers et al. | |
| 2016/0026253 A1 | 1/2016 | Bradski et al. | |
| 2016/0042648 A1 | 2/2016 | Kothuri | |
| 2016/0132290 A1 | 5/2016 | Raux | |
| 2016/0203454 A1 | 7/2016 | Kogoshi | |
| 2016/0284134 A1 | 9/2016 | Kamhi et al. | |
| 2016/0309081 A1 | 10/2016 | Frahm et al. | |
| 2016/0328621 A1 | 11/2016 | Negi et al. | |
| 2016/0330346 A1 | 11/2016 | Hayashi et al. | |
| 2016/0373269 A1 | 12/2016 | Okubo et al. | |
| 2017/0160813 A1* | 6/2017 | Divakaran | G06K 9/00221 |
| 2017/0169818 A1 | 6/2017 | VanBlon et al. | |
| 2017/0289766 A1 | 10/2017 | Scott et al. | |
| 2017/0312614 A1 | 11/2017 | Tran et al. | |
| 2017/0315825 A1 | 11/2017 | Gordon et al. | |
| 2018/0011543 A1 | 1/2018 | Funami | |
| 2018/0061400 A1 | 3/2018 | Carbune et al. | |
| 2018/0107275 A1* | 4/2018 | Chen | G06F 3/015 |
| 2018/0185753 A1 | 7/2018 | Nakagawa et al. | |
| 2018/0246569 A1* | 8/2018 | Arakawa | G06F 40/169 |
| 2019/0019508 A1* | 1/2019 | Rochford | G06F 3/013 |
| 2019/0060602 A1* | 2/2019 | Tran | G06F 3/013 |
| 2019/0080519 A1* | 3/2019 | Osman | H04N 13/383 |
| 2019/0094981 A1 | 3/2019 | Bradski et al. | |
| 2019/0102706 A1 | 4/2019 | Frank et al. | |
| 2019/0138268 A1 | 5/2019 | Andersen et al. | |
| 2019/0187787 A1* | 6/2019 | White | G06F 3/013 |
| 2019/0199759 A1 | 6/2019 | Anderson et al. | |
| 2019/0246036 A1 | 8/2019 | Wu et al. | |
| 2019/0294252 A1 | 9/2019 | Li | |
| 2019/0304157 A1 | 10/2019 | Amer et al. | |
| 2019/0324527 A1 | 10/2019 | Presant et al. | |
| 2019/0369748 A1 | 12/2019 | Hindi et al. | |
| 2019/0371327 A1 | 12/2019 | Quinn et al. | |
| 2020/0104653 A1 | 4/2020 | Solomon et al. | |
| 2020/0167597 A1* | 5/2020 | Nguyen | G06F 3/011 |
| 2020/0286484 A1 | 9/2020 | Scanlon | |
| 2020/0341546 A1* | 10/2020 | Yuan | G06F 3/013 |
| 2020/0342223 A1* | 10/2020 | Mixter | G06F 3/167 |
| 2020/0349966 A1* | 11/2020 | Konzelmann | G06K 9/00597 |
| 2020/0380977 A1* | 12/2020 | Unter Ecker | G06K 9/00604 |
| 2020/0396533 A1* | 12/2020 | Meiyappan | G06F 3/167 |
| 2022/0001134 A1* | 1/2022 | Tran | G16H 30/40 |

FOREIGN PATENT DOCUMENTS

| | | |
|---|---|---|
| EP | 3012833 | 4/2016 |
| EP | 3413303 | 7/2020 |
| JP | 11024694 | 1/1999 |
| JP | H1124694 | 1/1999 |
| JP | 2010102235 | 5/2010 |
| JP | 2012014394 | 1/2012 |
| JP | 2012242609 | 12/2012 |
| JP | 2014048936 | 3/2014 |
| JP | 2015514254 | 5/2015 |
| JP | 2015135674 A | 7/2015 |
| JP | 2016004270 | 1/2016 |
| JP | 2016502137 A | 1/2016 |
| JP | 2016502721 A | 1/2016 |
| JP | 2016131288 | 7/2016 |
| JP | 2016526211 A | 9/2016 |
| JP | 2016212624 A | 12/2016 |
| JP | 2017010176 | 1/2017 |
| JP | 2017138476 | 8/2017 |
| JP | 2017138536 | 8/2017 |
| JP | 2019505011 A | 2/2019 |
| KR | 20140029223 A | 3/2014 |
| KR | 20150138109 | 12/2015 |
| KR | 20160145054 | 12/2016 |
| WO | 2013162603 | 10/2013 |
| WO | 2014078480 A1 | 5/2014 |
| WO | 2014085269 | 6/2014 |
| WO | 2014203495 | 2/2017 |
| WO | 2017002473 | 4/2018 |
| WO | 2018061173 | 4/2018 |
| WO | 2017203769 | 4/2019 |

OTHER PUBLICATIONS

Siatras et al., "Visual Lip Activity Detection and Speaker Detection Using Mouth Regions Intensities" Aristotle University of Thessaloniki, 2008 (5 Pages).
International Search Report and Written Opinion issued in Application No. PCT/US2018/031170 dated Dec. 14, 2018 (16 Pages).
European Pa 1 Ent Office; Communication issued in Application No. 21156633.6; 8 pages; dated May 11, 2021.
Japanese Patent Office; Notice of Reasons for Rejection issued in Application No. 2021512357; 14 pages dated Jan. 4, 2022.
Intellectual Property India; Examination Report issued in Application No. 202027052360; 8 pages; dated Sep. 10, 2021.
Japanese Patent Office; Decision of Rejection issued in app. No. 2021-512357, 9 pages, dated Jul. 25, 2022.
European Patent Office; Communication pursuant to Article 94(3) issued in Application No. 21156633.6, 4 pages, dated Apr. 28, 2022.
Kepuska, V. et al; Next-generation of virtual personal assistants (Microsoft Cortana, Apple Siri, Amazon Alexa and Google Home); 2018 IEEE 8th Annual Computing and Communication Workshop and Conference (CCWC); pp. 99-103, doi: 10.1109/CCWC.2018.8301638; dated 2018.
The Korean Intellectual Property Office; Notice of Office Action issued in Application No. 10-2020-7034907; 13 pages; dated Jan. 12, 2023.

(56) References Cited

OTHER PUBLICATIONS

Japanese Patent Office; Pre-Appeal Report issued in app. No. 2021-512357, 5 pages, dated Dec. 15, 2022.

* cited by examiner

ADAPTING AUTOMATED ASSISTANT BASED ON DETECTED MOUTH MOVEMENT AND/OR GAZE

BACKGROUND

Humans may engage in human-to-computer dialogs with interactive software applications referred to herein as "automated assistants" (also referred to as "digital agents," "interactive personal assistants," "intelligent personal assistants," "assistant applications," "conversational agents," etc.). For example, humans (which when they interact with automated assistants may be referred to as "users") may provide commands and/or requests to an automated assistant using spoken natural language input (i.e., utterances), which may in some cases be converted into text and then processed, and/or by providing textual (e.g., typed) natural language input. An automated assistant responds to a request by providing responsive user interface output, which can include audible and/or visual user interface output.

SUMMARY

Many client devices that facilitate interaction with automated assistants—also referred to herein as "assistant devices"— enable users to engage in touch-free interaction with automated assistants. For example, assistant devices often include microphones that allow users to provide vocal utterances to invoke and/or otherwise interact with an automated assistant. Assistant devices described herein can additionally or alternatively incorporate, and/or be in communication with, one or more vision components (e.g., camera(s)), Light Detection and Ranging (LIDAR) component(s), radar component(s), etc.) to facilitate touch-free interactions with an automated assistant.

Implementations disclosed herein relate to adapting an automated assistant based on detecting: (1) movement of a mouth of a user (also referred to herein as "mouth movement"); and/or (2) that a gaze of the user is directed at an assistant device (also referred to herein as "directed gaze"), where the assistant device provides an automated assistant interface (graphical and/or audible) of the automated assistant. The detecting of the mouth movement and/or the directed gaze can be based on processing of vision data from one or more vision components associated with the assistant device, such as a camera incorporated in the assistant device, or a camera that is separate from (but in communication with) the client device. The mouth movement that is detected can be movement that is indicative of a user (to whom the mouth belongs) speaking. This is in contrast to movement of a user's mouth that may occur as a result of the user turning his/her head, stepping left/right, etc. As will be explained below, the implementations described herein may provide efficiencies in computing resources and communication networks used to implement automated assistants. For example, as will be evident from the discussions below, aspects of the implementations may produce more selective initiation of communication over a data network and corresponding reductions in data traffic over the network. The more selective initiation of network communication, e.g. from a client device, may further lead to more efficient usage of computing resources at a remote system with which the communication is initiated, since some potential communication from the client device is filtered out before any contact with the remote system is initiated. The efficiency improvements in usage of data networks and computing resources on remote systems can lead to significant savings in terms of power usage by transmitters and receivers in the network, as well as in terms of memory operations and processing usage at the remote system. Corresponding effects may also be experienced at the client device, as described below. These effects, particularly over time and the ongoing operation of the automated assistant, allow significant additional capacity to be experienced in the network and in the computing apparatus as a whole, including the devices and systems which run the assistant. This additional capacity can be used for further communication in the data network, whether assistant-related or not, without the need to expand network capability e.g. through additional or updated infrastructure, and additional computing operations in the computing apparatus. Other technical improvements will be evident from the following discussion.

As one example, the automated assistant can be adapted in response to detecting mouth movement of a user (optionally for a threshold duration), detecting that the gaze of the user is directed at an assistant device (optionally for the same or different threshold duration), and optionally that the mouth movement and the directed gaze of the user co-occur or occur within a threshold temporal proximity of one another (e.g., within 0.5 seconds, within 1.0 seconds, or other threshold temporal proximity). For instance, the automated assistant can be adapted in response to detecting mouth movement that is of at least a 0.3 second duration, and in response to detecting a directed gaze that is of at least a 0.5 second duration and that co-occurred with the mouth movement, or occurred within 0.5 seconds of the mouth movement.

In some implementations, an automated assistant can be adapted in response to detecting the mouth movement and the directed gaze alone. In some other implementations, the automated assistant can be adapted in response to detecting the mouth movement and the directed gaze, and detecting the occurrence of one or more other condition(s). The occurrence of the one or more other conditions can include, for example: detecting, based on audio data, voice activity (e.g., any voice activity, voice activity of the user providing the mouth movement and directed gaze, voice activity of an authorized user, voice activity that includes a spoken invocation phrase) in temporal proximity to the detected mouth movement and directed gaze; detecting, based on vision data, a gesture (e.g., "hand wave", "thumbs up", "high five") of the user that co-occurs with, or is in temporal proximity to, the detected mouth movement and directed gaze; detecting, based on audio data and/or vision data, that the user is an authorized user; and/or detecting other condition(s).

In some implementations disclosed herein, the adaptation of an automated assistant that occurs in response to detecting a mouth movement and directed gaze can include adaptation of the rendering of user interface output by the assistant device. In some of those implementations, the adaptation of the rendering of the user interface output includes reducing the volume of audible user interface output being rendered by the assistant device, and/or halting of the audible user interface output and/or video output being visually rendered by the assistant device.

As one example, assume that mouth movement of a user is detected as the user begins to speak an utterance that is directed to the automated assistant, and that a directed gaze of the user is detected that co-occurs with the detected mouth movement. Further assume that prior to and during the detecting of the mouth movement and directed gaze, the assistant device is rendering audible and/or visual content. For instance, an automated assistant client of the assistant device can be causing audible rendering of a song and visual rendering a video for the song. In response to detecting the mouth movement and directed gaze, the automated assistant client can cause the volume of the audible rendering of the song to be reduced (while still continuing the audible rendering at the reduced volume, and the visual rendering of the video). Reduction of the volume can improve performance of processing of audio data that captures the spoken utterance, such as audio data captured via one or more microphones of the assistant device. For instance, voice-to-text processing of the audio data can be improved as a result of the reduction of volume, voice activity detection (VAD) based on the audio data can be improved as a result of the reduction of volume, speaker diarization based on the audio data can be improved as a result of the reduction of volume, etc. The improved processing of the audio data can increase the likelihood that the automated assistant properly interprets the spoken utterance, and responds in an appropriate manner. This can result in an improved user-assistant interaction and/or mitigate risk of an inappropriate automated assistant response, which can cause the user to repeat the spoken utterance (and resultantly requires computational resources to be expended in processing the repeated spoken utterance and generating and rendering another response).

As a variant of the above example, the adaptation can include halting of the audible rendering of the song (and optionally of the video), in lieu of the reduction of volume. As a further variant of the above example, the adaptation can initially include reduction of the volume of the audible rendering of the song, and the adaptation can further include a subsequent halting of the audible rendering of the song, in response to occurrence of one or more other condition(s). For example, the reduction of the volume can occur in response to detecting the mouth movement and the directed gaze alone, and the halting can occur in response to a later detection of the occurrence of voice activity, based on processing of audio data.

In some implementations, the adaptation of the rendering of user interface output by the assistant device can additionally or alternatively include the rendering of a human perceptible cue. The rendering of the human perceptible cue can optionally be provided prior to further adapting the automated assistant, and can indicate (directly or indirectly) that the further adapting is about to occur. For example, the rendering of the human perceptible cue can occur in response to initially detecting mouth movement and a directed gaze, and the further adapting can occur in response to detecting continued mouth movement and/or a continued directed gaze. Continuing with the example, the further adapting can include transmitting, by the client device to one or more remote automated assistant components, of certain sensor data generated by one or more sensor components of the client device (whereas no sensor data from the sensor component(s) was being transmitted prior to the further adapting). The certain sensor data can include, for example, vision and/or audio data captured after detecting the mouth movement and the directed gaze and/or buffered vision and/or audio data captured during performance of the mouth movement and/or during the directed gaze. By providing the human perceptible cue, the user can be alerted of the further adapting that is about to occur, and be provided with an opportunity to prevent the further adapting. For example, where the further adapting is contingent on a continued directed gaze of the user, the user can divert his/her gaze to prevent the further adapting (e.g., if the user did not intend to interact with the automated assistant and cause sensor data to be transmitted). In this manner, the further adapting can be prevented, along with the usage of network and/or computational resources that would result from the further adapting. Various human perceptible cues can be provided, such as an audible "ding", an audible "spoken output" (e.g., "Looks like you're talking to the Assistant, look away if you don't want to"), a visual symbol on a display screen of the assistant device, an illumination of light emitting diode(s) of the assistant device, etc.

In some implementations, the adaptation of the rendering of user interface output by the assistant device can additionally or alternatively include tailoring rendered content to the user corresponding to the detected mouth movement and directed gaze. Tailoring the rendered content can include determining a distance of the user, relative to the assistant device, and rendering content in a manner that is based on the distance. For example, audible content can be rendered at a volume that is based on the distance of the user corresponding to the detected mouth movement and directed gaze. Also, for example, visual content can be rendered with a size that is based on the distance of the user corresponding to the detected mouth movement and directed gaze. As yet another example, content can be generated based on the distance. For instance, more detailed content can be generated when the distance is relatively close to the client device, whereas less detailed content can be generated when the distance is relatively far from the client device. As one particular instance, in response to a spoken utterance of "what's the weather", a one day weather forecast can be generated at the relatively close distance, whereas a three day weather forecast can be generated at the relatively far distance. The distance of the user can be determined in response to that user corresponding to the detected mouth movement and directed gaze (which can indicate the user is verbally engaging with the automated assistant). This can be useful in situations where multiple users (at multiple distances) are captured in vision data, as tailoring the rendered content to the distance of the user corresponding to the detected mouth movement and directed gaze enables tailoring of the rendered content to the user that is actively engaged in dialog with the automated assistant.

In some implementations disclosed herein, and as mentioned above, the adaptation of an automated assistant that occurs in response to detecting a mouth movement and directed gaze can additionally and/or alternatively include adaptation of the processing of sensor data, such as the processing of audio data and/or vision data.

In some of those implementations, the adaptation can include the initiation of certain processing of certain sensor data (e.g., audio data, video, image(s), etc.) in response to detecting the mouth movement and the directed gaze (whereas the certain processing was not being performed prior). For example, prior to detecting a mouth movement and directed gaze, an automated assistant may perform only limited (or no) processing of certain sensor data such as audio data, video/image data, etc. For instance, prior to such detection, the automated assistant can locally process audio data in monitoring for an explicit invocation phrase, but will "discard" the data after local processing and without causing the audio data to be processed by one or more additional components that implement the automated assistant (e.g., remote server device(s) that process user inputs and generate appropriate responses). However, in response to detecting a mouth movement and directed gaze (and optionally the occurrence of one or more other condition(s)), such data can be processed by the additional component(s). In these and other manners, processing and/or network resources can be reduced by only transmitting and/or performing certain processing of certain sensor data in response to detecting a mouth movement and directed gaze.

In some additional or alternative implementations described herein, the adaptation of the processing of sensor data can include adapting of local and/or remote processing based on a determined position of the user for whom the mouth movement and directed gaze are detected. The position of the user can be relative to the client device and can be determined, for example, based on portions of vision data determined to correspond to the user. The processing of the audio data based on the position of the user can include, for example, isolating portions of the audio data that correspond to a spoken utterance and/or removing background noise from the audio data. Such processing can rely on the determined position and beamforming and/or other techniques in isolating the portions of the audio data and/or removing background noise from the audio data. This can improve processing of audio data in environments that have significant background noise, multiple speakers speaking simultaneously, etc.

In some implementations, in monitoring for mouth movement and in monitoring for a gaze that is directed to the client device, trained machine learning model(s) (e.g., neural network model(s)) that are stored locally on the client device are utilized by the client device to at least selectively process at least portions of vision data from vision component(s) of the client device (e.g., image frames from camera(s) of the client device). For example, in response to detecting presence of one or more users, the client device can process, for at least a duration (e.g., for at least a threshold duration and/or until presence is no longer detected) at least portion(s) of vision data utilizing the locally stored machine learning model(s) in monitoring for the mouth movement and the directed gaze. The client device can detect presence of one or more users using a dedicated presence sensor (e.g., a passive infrared sensor (PIR)), using vision data and a separate machine learning model (e.g., a separate machine learning model trained solely for human presence detection), and/or using audio data and a separate machine learning model (e.g., VAD using a VAD machine learning model). In implementations where processing of vision data in monitoring for mouth movement and/or a directed gaze is contingent on first detecting presence of one or more users, power resources can be conserved through the non-continual processing of vision data in monitoring for mouth movement and/or a directed gaze. Rather, in those implementations, the processing of vision data in monitoring for mouth movement and/or a directed gaze can occur only in response to detecting, via one or more lower-power-consumption techniques, presence of one or more user(s) in an environment of the assistant device.

In some implementations where local machine learning model(s) are utilized in monitoring for mouth movement and a directed gaze, at least one mouth movement machine learning model is utilized in monitoring for the mouth movement, and a separate gaze machine learning model is utilized in monitoring for the directed gaze. In some versions of those implementations, one or more "upstream" models (e.g., object detection and classification model(s)) can be utilized to detect portions of vision data (e.g., image(s)) that are likely a face, likely eye(s), likely a mouth, etc.—and those portion(s) processed using a respective machine learning model. For example, face and/or eye portion(s) of an image can be detected using the upstream model, and processed using the gaze machine learning model. Also, for example, face and/or mouth portion(s) of an image can be detected using the upstream model, and processed using the mouth movement machine learning model. As yet another example, human portion(s) of an image can be detected using the upstream model, and processed using both the gaze detection machine learning model and the mouth movement machine learning model.

In some implementations, face matching, eye matching, voice matching, and/or other techniques can be utilized to identify a particular user profile that is associated with the mouth movement and/or directed gaze, and content rendered, by the automated assistant application of the client device, which is tailored to the particular user profile. The rendering of the tailored content can be all or part of the adapting of the automated assistant that is responsive to detecting the mouth movement and directed gaze. Optionally, identification of the particular user profile occurs only after mouth movement and a directed gaze have been detected. In some implementations, and as mentioned above, for adaptation of the automated assistant the occurrence of one or more additional conditions can also be required—where the additional condition(s) are in addition to gaze and/or mouth movement detection. For example, in some implementations the additional condition(s) can include identifying that the user providing the mouth movement and the directed gaze is associated with a user profile that is authorized for the client device (e.g., using face matching, voice matching, and/or other techniques).

In some implementations, certain portions of video(s)/image(s) can be filtered out/ignored/weighted less heavily in detecting mouth movement and/or gaze. For example, a television captured in video(s)/image(s) can be ignored to prevent false detections as a result of a person rendered by the television (e.g., a weatherperson). For instance, a portion of an image can be determined to correspond to a television based on a separate object detection/classification machine learning model, in response to detecting a certain display frequency in that portion (i.e., that matches a television refresh rate) over multiple frames for that portion, etc. Such a portion can be ignored in mouth movement and/or directed gaze detection techniques described herein, to prevent detection of mouth movement and/or directed gaze from a television or other video display device. As another example, picture frames can be ignored. These and other techniques can mitigate false-positive adaptations of an automated assistant, which can conserve various computational and/or network resources that would otherwise be consumed in a false-positive adaptations. Also, in various implementations, once a TV, picture frame, etc. location is detected, it can optionally continue to be ignored over multiple frames (e.g., while verifying intermittently, until movement of client device or object(s) is detected, etc.). This can also conserve various computational resources.

The above description is provided as an overview of various implementations disclosed herein. Those various implementations, as well as additional implementations, are described in more detail herein.

In some implementations, a method is provided that is performed by one or more processors of a client device that facilitates touch-free interaction between one or more users and an automated assistant. The method includes receiving a stream of image frames that are based on output from one or more cameras of the client device. The method further includes processing the image frames of the stream using at least one trained machine learning model stored locally on the client device to monitor for occurrence of both: a gaze of a user that is directed toward the one or more cameras of the client device, and movement of a mouth of the user. The method further includes detecting, based on the monitoring, occurrence of both: the gaze of the user, and the movement of the mouth of the user. The method further includes, in response to detecting the occurrence of both the gaze of the user and the movement of the mouth of the user, performing one or both of: adapting rendering of user interface output of the client device, and adapting audio data processing by the client device.

These and other implementations of the technology described herein can include one or more of the following features.

In some implementations, adapting rendering of user interface output of the client device is performed in response to detecting the occurrence of both the gaze of the user and the movement of the mouth of the user. In some of those implementations, adapting rendering of user interface output of the client device includes: reducing a volume of audible user interface output rendered by the client device. In some versions of those implementations, the method further includes performing voice activity detection of audio data that temporally corresponds with the movement of the mouth of the user, and determining occurrence of voice activity based on the voice activity detection of the audio data that temporally corresponds to the mouth movement of the user. In those versions, reducing the volume of the audible user interface output rendered by the client device is further in response to determining the occurrence of voice activity, and based on the occurrence of the voice activity being for the audio data that temporally corresponds to the mouth movement of the user.

In some implementations where adapting rendering of user interface output of the client device is performed in response to detecting the occurrence of both the gaze of the user and the movement of the mouth of the user, adapting rendering of the user interface output includes halting the rendering of audible user interface output rendered by the client device. In some of those implementations, the method further includes performing voice activity detection of audio data that temporally corresponds with the movement of the mouth of the user, and determining occurrence of voice activity based on the voice activity detection of the audio data that temporally corresponds to the mouth movement of the user. In those implementations, halting the rendering of the audible user interface output rendered by the client device is further in response to determining the occurrence of voice activity, and based on the occurrence of the voice activity being for the audio data that temporally corresponds to the mouth movement of the user.

In some implementations: adapting rendering of user interface output of the client device includes rendering a human perceptible cue; adapting audio data processing by the client device is performed in response to detecting the occurrence of both the gaze of the user and the movement of the mouth of the user; adapting the audio data processing by the client device includes initiating local automatic speech recognition at the client device; and initiating the local automatic speech recognition is further in response to detecting the gaze of the user continues to be directed toward the one or more cameras of the client device following the rendering of the cue.

In some implementations: adapting rendering of user interface output of the client device includes rendering a human perceptible cue; adapting audio data processing by the client device is performed in response to detecting the occurrence of both the gaze of the user and the movement of the mouth of the user; adapting the audio data processing by the client device includes initiating transmission of audio data, captured via one or more microphones of the client device, to a remote server associated with the automated assistant; and initiating the transmission of audio data to the remote server is further in response to detecting the gaze of the user continues to be directed toward the one or more cameras of the client device following the rendering of the cue.

In some implementations adapting audio data processing by the client device is performed in response to detecting the occurrence of both the gaze of the user and the movement of the mouth of the user. In some of those implementations, adapting the audio data processing by the client device includes initiating the transmission of audio data, captured via one or more microphones of the client device, to a remote server associated with the automated assistant. In some versions of those implementations, the method further includes: performing voice activity analysis of certain audio data, included in the audio data or preceding the audio data, that temporally corresponds with the movement of the mouth of the user; and determining occurrence of voice activity based on the voice activity analysis of the certain audio data that temporally corresponds to the mouth movement of the user. In those versions, initiating the transmission of audio data is further in response to determining the occurrence of voice activity, and based on the occurrence of the voice activity being for the audio data that temporally corresponds to the mouth movement of the user.

In some implementations where adapting audio data processing by the client device is performed in response to detecting the occurrence of both the gaze of the user and the movement of the mouth of the user, adapting the audio data processing includes: determining a position of the user, relative to the client device, based one or more of the image frames; and using the position of the user in processing of audio data captured via one or more microphones of the client device. In some versions of those implementations, using the position of the user in processing of audio data captured via one or more microphones of the client device includes using the position in isolating portions of the audio data that correspond to a spoken utterance of the user. In some additional or alternative versions of those implementations, using the position of the user in processing of audio data captured via one or more microphones of the client device includes using the position in removing background noise from the audio data.

In some implementations, processing the image frames of the stream using at least one trained machine learning model stored locally on the client device to monitor for occurrence of both the gaze of the user and the movement of the mouth of the user includes: using a first trained machine learning model to monitor for occurrence of the gaze of the user; and using a second trained machine learning model to monitor for the movement of the mouth of the user.

In some implementations, the method further includes: detecting, based on a signal from a presence sensor, that a human is present in an environment of the client device; and causing the one or more cameras to provide the stream of image frames in response to detecting that the human is present in the environment.

In some implementations, a client device is provided and includes at least one vision component, at least one microphone, one or more processors, and memory operably coupled with the one or more processors. The memory stores instructions that, in response to execution of the instructions by one or more of the processors, cause one or more of the processors to perform the following operations: receiving a stream of vision data that is based on output from the vision component of the client device; processing the vision data of the stream using at least one trained machine learning model stored locally on the client device to monitor for occurrence of both: a gaze of a user that is directed toward the vision component of the client device, and movement of a mouth of the user; detecting, based on the monitoring, occurrence of both: the gaze of the user, and the movement of the mouth of the user; and in response to detecting the occurrence of both the gaze of the user and the movement of the mouth of the user: adapting rendering of user interface output of the client device.

In some implementations, a system is provided and includes at least one vision component, one or more microphones, and one or more processors receiving a stream of vision data that is based on output from the vision component. One or more of the processors are configured to: process the vision data of the stream using at least one trained machine learning model to monitor for occurrence of both: a gaze of a user that is directed toward the vision component, and movement of a mouth of the user; detect, based on the monitoring, occurrence of both: the gaze of the user, and the movement of the mouth of the user; and in response to detecting the occurrence of both the gaze of the user and the movement of the mouth of the user, perform both of: adapting rendering of user interface output of the client device, and adapting processing of audio data captured via the one or more microphones.

In addition, some implementations include one or more processors of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
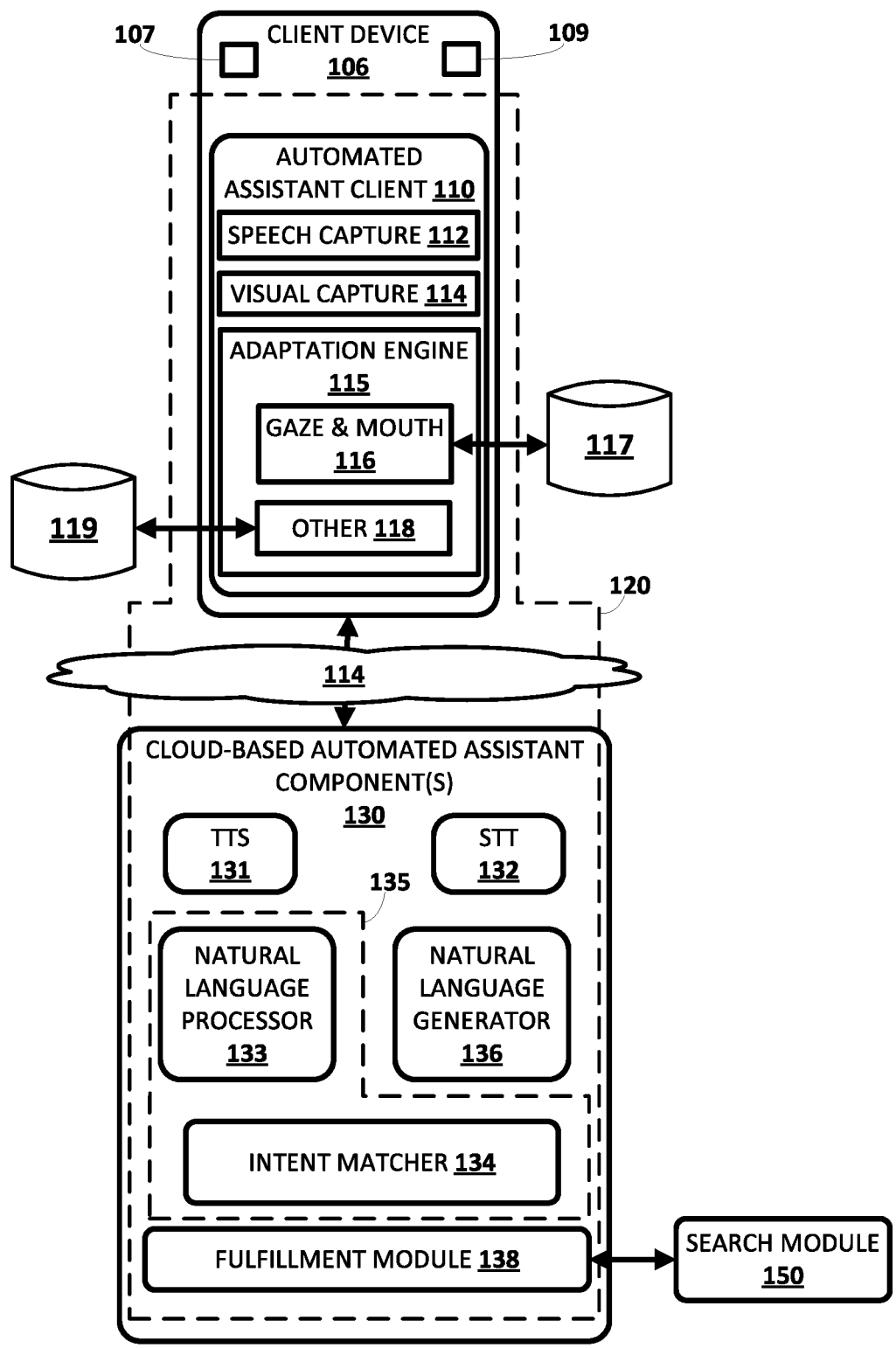
FIG. 1 is a block diagram of an example environment in which implementations disclosed herein may be implemented.

FIG. 1 illustrates an example environment in which techniques disclosed herein may be implemented. The example environment includes one or more client computing devices 106. Each client device 106 may execute a respective instance of an automated assistant client 110. One or more cloud-based automated assistant components 130 can be implemented on one or more computing systems (collectively referred to as a "cloud" computing system) that are communicatively coupled to client devices 106 via one or more local and/or wide area networks (e.g., the Internet) indicated generally at 114. The cloud-based automated assistant components 130 can be implemented, for example, via a cluster of high-performance servers.

In various implementations, an instance of an automated assistant client 110, by way of its interactions with one or more cloud-based automated assistant components 130, may form what appears to be, from a user's perspective, a logical instance of an automated assistant 120 with which the user may engage in a human-to-computer interactions (e.g., spoken interactions, gesture-based interactions, and/or touch-based interactions). One instance of such an automated assistant 120 is depicted in FIG. 1 in dashed line. It thus should be understood that each user that engages with an automated assistant client 110 executing on a client device 106 may, in effect, engage with his or her own logical instance of an automated assistant 120. For the sakes of brevity and simplicity, the term "automated assistant" as used herein as "serving" a particular user will refer to the combination of an automated assistant client 110 executing on a client device 106 operated by the user and optionally one or more cloud-based automated assistant components 130 (which may be shared amongst multiple automated assistant clients 110). It should also be understood that in some implementations, automated assistant 120 may respond to a request from any user regardless of whether the user is actually "served" by that particular instance of automated assistant 120.

The one or more client devices 106 may include, for example, one or more of: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone interactive speaker (which in some cases may include a vision sensor), a smart appliance such as a smart television (or a standard television equipped with a networked dongle with automated assistant capabilities), and/or a wearable apparatus of the user that includes a computing device (e.g., a watch of the user having a computing device, glasses of the user having a computing device, a virtual or augmented reality computing device). Additional and/or alternative client computing devices may be provided. As noted previously, some client devices 106 may take the form of assistant devices that are primarily designed to facilitate interactions between users and automated assistant 120 (e.g., a standalone interactive device with speaker(s) and a display).

Client device 106 can be equipped with one or more vision components 107 having one or more fields of view. Vision component(s) 107 may take various forms, such as monographic cameras, stereographic cameras, a LIDAR component, a radar component, etc. The one or more vision components 107 may be used, e.g., by a visual capture module 114, to capture vision frames (e.g., image frames (still images or video)) of an environment in which client device 106 is deployed. These vision frames may then be at least selectively analyzed, e.g., by a gaze and mouth module 116 of adaptation engine 115, to monitor for occurrence of: mouth movement of a user (e.g., movement of the mouth that is indicative of the user speaking) captured by the vision frames and/or a directed gaze from the user (e.g., a gaze that is directed toward the client device 106). The gaze and mouth module 116 can utilize one or more trained machine learning models 117 in monitoring for occurrence of mouth movement and/or a directed gaze.

In response to detection of mouth movement and the directed gaze (and optionally in response to detection of one or more other condition(s) by other conditions module 118), the adaptation engine 115 can adapt one or more aspects of the automated assistant 120, such as aspects of the automated assistant client 110 and/or aspects of the cloud-based automated assistant component(s) 130. Such adaptation can include, for example, adapting of user interface output (e.g., audible and/or visual) that is rendered by the client device 106 and controlled by the automated assistant client 110. Such adaptation can additionally or alternatively include, for example, adapting of sensor data processing by the client device 106 (e.g., by one or more components of the automated assistant client) and/or by one or more cloud-based automated assistant component(s) 130.

As one non-limiting example of adapting sensor data processing, prior to detection of the mouth movement and the directed gaze, vision data and/or audio data captured at the client device 106 can be processed and/or temporarily buffered only locally at the client device 106 (i.e., without transmission to the cloud-based automated assistant component(s) 130). However, in response to detection of mouth movement and the directed gaze, such processing can be adapted by causing transmission of audio data and/or vision data (e.g., recently buffered data and/or data received after the detection) to the cloud-based automated assistant component(s) 130 for further processing. For example, the detection of the mouth movement and the directed gaze can obviate a need for the user to speak an explicit invocation phrase (e.g., "OK Assistant") in order to cause a spoken utterance of the user to be fully processed by the automated assistant 120, and responsive content generated by the automated assistant 120 and rendered to the user.

For instance, rather than the user needing to speak "OK Assistant, what's today's forecast" to obtain today's forecast, the user could instead: look at the client device 106, and speak only "what's today's forecast" during or temporally near (e.g., within a threshold of time before and/or after) looking at the client device 106. Data corresponding to the spoken utterance "What's today's forecast" (e.g., audio data that captures the spoken utterance, or a textual or other semantic conversion thereof) can be transmitted by the client device 106 to the cloud-based automated assistant component(s) 130 in response to detecting the mouth movement (caused by speaking all or portions of "what's today's weather forecast") and the directed gaze, and in response to the spoken utterance being received during and/or temporally near the mouth movement and directed gaze.

In another example, rather than the user needing to speak "OK Assistant, turn up the heat" to increase the temperature of his/her home via a connected thermostat, the user could instead: look at the client device 106, and speak only "turn up the heat" during or temporally near (e.g., within a threshold of time before and/or after) looking at the client device 106. Data corresponding to the spoken utterance "turn up the heat" (e.g., audio data that captures the spoken utterance, or a textual or other semantic conversion thereof) can be transmitted by the client device 106 to the cloud-based automated assistant component(s) 130 in response to detecting the mouth movement (caused by speaking all or portions of "turn up the heat") and the directed gaze, and in response to the spoken utterance being received during and/or temporally near the mouth movement and directed gaze.

In another example, rather than the user needing to speak "OK Assistant, open the garage door" to open his/her garage, the user could instead: look at the client device 106, and speak only "open the garage door" during or temporally near (e.g., within a threshold of time before and/or after) looking at the client device 106. Data corresponding to the spoken utterance "open the garage door" (e.g., audio data that captures the spoken utterance, or a textual or other semantic conversion thereof) can be transmitted by the client device 106 to the cloud-based automated assistant component(s) 130 in response to detecting the mouth movement (caused by speaking all or portions of "open the garage door") and the directed gaze, and in response to the spoken utterance being received during and/or temporally near the mouth movement and directed gaze.

In some implementations, the transmission of the data by the client device 106 can be further contingent on the other condition module 118 determining the occurrence of one or more additional conditions. For example, the transmission of the data can be further based on local voice activity detection processing of the audio data, performed by the other conditions module 118, indicating that voice activity is present in the audio data. Also, for example, the transmission of the data can additionally or alternatively be further based on determining, by the other conditions module 118, that the audio data corresponds to the user that provided the gesture and the directed gaze. For instance, a direction of the user (relative to the client device 106) can be determined based on the vision data, and the transmission of the data can be further based on determining, by the other conditions module 118, that a spoken utterance in the audio data comes from the same direction (e.g., using beamforming and/or other techniques). Also, for instance, a user profile of the user can be determined based on the vision data (e.g., using facial recognition) and the transmission of the data can be further based on determining, by the other conditions module 118, that a spoken utterance in the audio data has voice characteristics that match the user profile. As yet another example, transmission of the data can additionally or alternatively be further based on determining, by the other conditions module 118 based on vision data, that a gesture (e.g., any of one or more candidate invocation gestures) of the user co-occurred with the mouth movement and/or directed gaze of the user, or occurred with a threshold amount of time of the detected mouth movement and/or directed gaze. The other conditions module 118 can optionally utilize one or more other machine learning models 119 in determining that other condition(s) are present. Additional description of implementations of gaze and mouth module 116, and of the other conditions module 118, is provided herein (e.g., with reference to FIGS. 2A-2B). Further, additional description of implementations of adapting an automated assistant based on a detected mouth movement and/or gaze are provided herein (e.g., with reference to FIGS. 4B-4D).

Each of client computing device 106 and computing device(s) operating cloud-based automated assistant components 130 may include one or more memories for storage of data and software applications, one or more processors for accessing data and executing applications, and other components that facilitate communication over a network. The operations performed by client computing device 106 and/or by automated assistant 120 may be distributed across multiple computer systems. Automated assistant 120 may be implemented as, for example, computer programs running on one or more computers in one or more locations that are coupled to each other through a network.

As noted above, in various implementations, client computing device 106 may operate an automated assistant client 110. In some of those various implementations, automated assistant client 110 may include a speech capture module 112, the aforementioned visual capture module 114, and an adaptation engine 115, which can include the gaze and mouth module 116 and optionally the other conditions module 118. In other implementations, one or more aspects of speech capture module 112, visual capture module 114, and/or adaptation engine 115 may be implemented separately from automated assistant client 110, e.g., by one or more cloud-based automated assistant components 130.

In various implementations, speech capture module 112, which may be implemented using any combination of hardware and software, may interface with hardware such as a microphone(s) 109 or other pressure sensor to capture an audio recording of a user's spoken utterance(s). Various types of processing may be performed on this audio recording for various purposes, as will be described below. In various implementations, visual capture module 114, which may be implemented using any combination of hardware or software, may be configured to interface with visual component 107 to capture one or more vision frames (e.g., digital images), that correspond to an optionally adaptable field of view of the vision sensor 107.

Speech capture module 112 may be configured to capture a user's speech, e.g., via microphone(s) 109, as mentioned previously. Additionally or alternatively, in some implementations, speech capture module 112 may be further configured to convert that captured audio to text and/or to other representations or embeddings, e.g., using speech-to-text ("STT") processing techniques. However, because client device 106 may be relatively constrained in terms of computing resources (e.g., processor cycles, memory, battery, etc.), speech capture module 112 local to client device 106 may be configured to convert a finite number of different spoken phrases—such as phrases that invoke automated assistant 120—to text (or to other forms, such as lower dimensionality embeddings). Other speech input may be sent to cloud-based automated assistant components 130, which may include a cloud-based STT module 132.

Cloud-based TTS module 131 may be configured to leverage the virtually limitless resources of the cloud to convert textual data (e.g., natural language responses formulated by automated assistant 120) into computer-generated speech output. In some implementations, TTS module 131 may provide the computer-generated speech output to client device 106 to be output directly, e.g., using one or more speakers. In other implementations, textual data (e.g., natural language responses) generated by automated assistant 120 may be provided to client device 106, and a local TTS module of client device 106 may then convert the textual data into computer-generated speech that is output locally.

Cloud-based STT module 132 may be configured to leverage the virtually limitless resources of the cloud to convert audio data captured by speech capture module 112 into text, which may then be provided to natural language understanding module 135. In some implementations, cloud-based STT module 132 may convert an audio recording of speech to one or more phonemes, and then convert the one or more phonemes to text. Additionally or alternatively, in some implementations, STT module 132 may employ a state decoding graph. In some implementations, STT module 132 may generate a plurality of candidate textual interpretations of the user's utterance, and utilize one or more techniques to select a given interpretation from the candidates.

Automated assistant 120 (and in particular, cloud-based automated assistant components 130) may include an intent understanding module 135, the aforementioned TTS module 131, the aforementioned STT module 132, and other components that are described in more detail herein. In some implementations, one or more of the modules and/or modules of automated assistant 120 may be omitted, combined, and/or implemented in a component that is separate from automated assistant 120. In some implementations one or more of the components of automated assistant 120, such as intent understanding module 135, TTS module 131, STT module 132, etc., may be implemented at least on part on client devices 106 (e.g., in combination with, or to the exclusion of, the cloud-based implementations).

In some implementations, automated assistant 120 generates various content for audible and/or graphical rendering to a user via the client device 106. For example, automated assistant 120 may generate content such as a weather forecast, a daily schedule, etc., and can cause the content to be rendered in response to detecting mouth movement and/or directed gaze from the user as described herein. Also, for example, automated assistant 120 may generate content in response to a free-form natural language input of the user provided via client device 106, in response to gestures of the user that are detected via vision data from visual component 107 of client device, etc. As used herein, free-form input is input that is formulated by a user and that is not constrained to a group of options presented for selection by the user. The free-form input can be, for example, typed input and/or spoken input.

Natural language processor 133 of intent understanding module 135 processes natural language input generated by user(s) via client device 106 and may generate annotated output (e.g., in textual form) for use by one or more other components of automated assistant 120. For example, the natural language processor 133 may process natural language free-form input that is generated by a user via one or more user interface input devices of client device 106. The generated annotated output includes one or more annotations of the natural language input and one or more (e.g., all) of the terms of the natural language input.

In some implementations, the natural language processor 133 is configured to identify and annotate various types of grammatical information in natural language input. For example, the natural language processor 133 may include a morphological module that may separate individual words into morphemes and/or annotate the morphemes, e.g., with their classes. Natural language processor 133 may also include a part of speech tagger configured to annotate terms with their grammatical roles. Also, for example, in some implementations the natural language processor 133 may additionally and/or alternatively include a dependency parser (not depicted) configured to determine syntactic relationships between terms in natural language input.

In some implementations, the natural language processor 133 may additionally and/or alternatively include an entity tagger (not depicted) configured to annotate entity references in one or more segments such as references to people (including, for instance, literary characters, celebrities, public figures, etc.), organizations, locations (real and imaginary), and so forth. In some implementations, data about entities may be stored in one or more databases, such as in a knowledge graph (not depicted), and the entity tagger of the natural language processor 133 can utilize such database(s) in entity tagging.

In some implementations, the natural language processor 133 may additionally and/or alternatively include a coreference resolver (not depicted) configured to group, or "cluster," references to the same entity based on one or more contextual cues. For example, the coreference resolver may be utilized to resolve the term "there" to "Hypothetical Café" in the natural language input "I liked Hypothetical Café last time we ate there."

In some implementations, one or more components of the natural language processor 133 may rely on annotations from one or more other components of the natural language processor 133. For example, in some implementations the named entity tagger may rely on annotations from the coreference resolver and/or dependency parser in annotating all mentions to a particular entity. Also, for example, in some implementations the coreference resolver may rely on annotations from the dependency parser in clustering references to the same entity. In some implementations, in processing a particular natural language input, one or more components of the natural language processor 133 may use related prior input and/or other related data outside of the particular natural language input to determine one or more annotations.

Intent understanding module 135 may also include an intent matcher 134 that is configured to determine an intent of a user engaged in an interaction with automated assistant 120. While depicted separately from natural language processor 133 in FIG. 1, in other implementations, intent matcher 134 may be an integral part of natural language processor 133 (or more generally, of a pipeline that includes natural language processor 133). In some implementations, natural language processor 133 and intent matcher 134 may collectively form the aforementioned intent understanding module 135.

Intent matcher 134 may use various techniques to determine an intent of the user, e.g., based on output from natural language processor 133 (which may include annotations and terms of the natural language input), based on user touch inputs at a touch-sensitive display of client device 106, and/or based on gestures and/or other visual cues detected in vision data. In some implementations, intent matcher 134 may have access to one or more databases (not depicted) that include, for instance, a plurality of mappings between grammars and responsive actions (or more generally, intents), visual cues and responsive actions, and/or touch inputs and responsive actions. For example, the grammars included in the mappings can be selected and/or learned over time, and may represent common intents of users. For example, one grammar, "play <artist>", may be mapped to an intent that invokes a responsive action that causes music by the <artist> to be played on the client device 106 operated by the user. Another grammar, "[weather|forecast] today," may be match-able to user queries such as "what's the weather today" and "what's the forecast for today?" As another example, the visual cue to action mappings can include "general" mappings that are applicable to multiple users (e.g., all users) and/or user-specific mappings. Some examples of visual cue to action mappings include mappings for gestures. For instance, a "wave" gesture can be mapped to an action of causing tailored content (tailored to the user providing the gesture) to be rendered to the user, a "thumbs up" gesture can be mapped to a "play music" action; and a "high five" gesture can be mapped to a "routine" of automated assistant actions to be performed, such as turning on a smart coffee maker, turning on certain smart lights, and audibly rendering a news summary.

In addition to or instead of grammars, in some implementations, intent matcher 134 may employ one or more trained machine learning models, alone or in combination with one or more grammars, visual cues, and/or touch inputs. These trained machine learning models may also be stored in one or more databases and may be trained to identify intents, e.g., by embedding data indicative of a user's utterance and/or any detected user-provided visual cues into a reduced dimensionality space, and then determining which other embeddings (and therefore, intents) are most proximate, e.g., using techniques such as Euclidean distance, cosine similarity, etc.

As seen in the "play <artist>" example grammar above, some grammars have slots (e.g., <artist>) that can be filled with slot values (or "parameters"). Slot values may be determined in various ways. Often users will provide the slot values proactively. For example, for a grammar "Order me a <topping> pizza," a user may likely speak the phrase "order me a sausage pizza," in which case the slot <topping> is filled automatically. Additionally or alternatively, if a user invokes a grammar that includes slots to be filled with slot values, without the user proactively providing the slot values, automated assistant 120 may solicit those slot values from the user (e.g., "what type of crust do you want on your pizza?"). In some implementations, slots may be filled with slot values based on visual cues detected based on vision data captured by vision component 107. For example, a user could utter something like "Order me this many cat bowls" while holding up three fingers to visual component 107 of client device 106. Or, a user could utter something like "Find me more movies like this" while holding of a DVD case for a particular movie.

In some implementations, automated assistant 120 may facilitate (or "broker") transactions between users and agents, which may be independent software processes that receive input and provide responsive output. Some agents may take the form of third party applications that may or may not operate on computing systems that are separate from those that operate, for instance, cloud-based automated assistant components 130. One kind of user intent that may be identified by intent matcher 134 is to engage a third party application. For example, automated assistant 120 may provide access to an application programming interface ("API") to a pizza delivery service. A user may invoke automated assistant 120 and provide a command such as "I'd like to order a pizza." Intent matcher 134 may map this command to a grammar that triggers automated assistant 120 to engage with the third party pizza delivery service. The third party pizza delivery service may provide automated assistant 120 with a minimum list of slots that need to be filled in order to fulfill a pizza delivery order. Automated assistant 120 may generate and provide to the user (via client device 106) natural language output that solicits parameters for the slots.

Fulfillment module 138 may be configured to receive the predicted/estimated intent that is output by intent matcher 134, as well as an associated slot values (whether provided by the user proactively or solicited from the user) and fulfill (or "resolve") the intent. In various implementations, fulfillment (or "resolution") of the user's intent may cause various fulfillment information (also referred to as "responsive" information or data) to be generated/obtained, e.g., by fulfillment module 138.

Fulfillment information may take various forms because an intent can be fulfilled in a variety of ways. Suppose a user requests pure information, such as "Where were the outdoor shots of 'The Shining' filmed?" The intent of the user may be determined, e.g., by intent matcher 134, as being a search query. The intent and content of the search query may be provided to fulfillment module 138, which as depicted in FIG. 1 may be in communication with one or more search modules 150 configured to search corpuses of documents and/or other data sources (e.g., knowledge graphs, etc.) for responsive information. Fulfillment module 138 may provide data indicative of the search query (e.g., the text of the query, a reduced dimensionality embedding, etc.) to search module 150. Search module 150 may provide responsive information, such as GPS coordinates, or other more explicit information, such as "Timberline Lodge, Mt. Hood, Oreg." This responsive information may form part of the fulfillment information generated by fulfillment module 138.

Additionally or alternatively, fulfillment module 138 may be configured to receive, e.g., from intent understanding module 135, a user's intent and any slot values provided by the user or determined using other means (e.g., GPS coordinates of the user, user preferences, etc.) and trigger a responsive action. Responsive actions may include, for instance, ordering a good/service, starting a timer, setting a reminder, initiating a phone call, playing media, sending a message, initiating a routine of multiple actions, etc. In some such implementations, fulfillment information may include slot values associated with the fulfillment, confirmation responses (which may be selected from predetermined responses in some cases), etc.

Additionally or alternatively, fulfillment module 138 may be configured to infer intent(s) of a user (e.g., based on time of day, past interactions, etc.) and obtain responsive information for those intent(s). For example, the fulfillment module 138 can be configured to obtain a daily calendar summary for a user, a weather forecast for the user, and/or other content for the user. The fulfillment module 138 can further cause such content to be "pushed" for graphical and/or audible rendering to the user. For example, the rendering of such content can be an adaptation that occurs in response to adaptation engine 115 detecting the occurrence of a mouth movement and a directed gaze.

Natural language generator 136 may be configured to generate and/or select natural language output (e.g., words/phrases that are designed to mimic human speech) based on data obtained from various sources. In some implementations, natural language generator 136 may be configured to receive, as input, fulfillment information associated with fulfillment of an intent, and to generate natural language output based on the fulfillment information. Additionally or alternatively, natural language generator 136 may receive information from other sources, such as third party applications, which it may use to compose natural language output for the user.

Figure 2A:
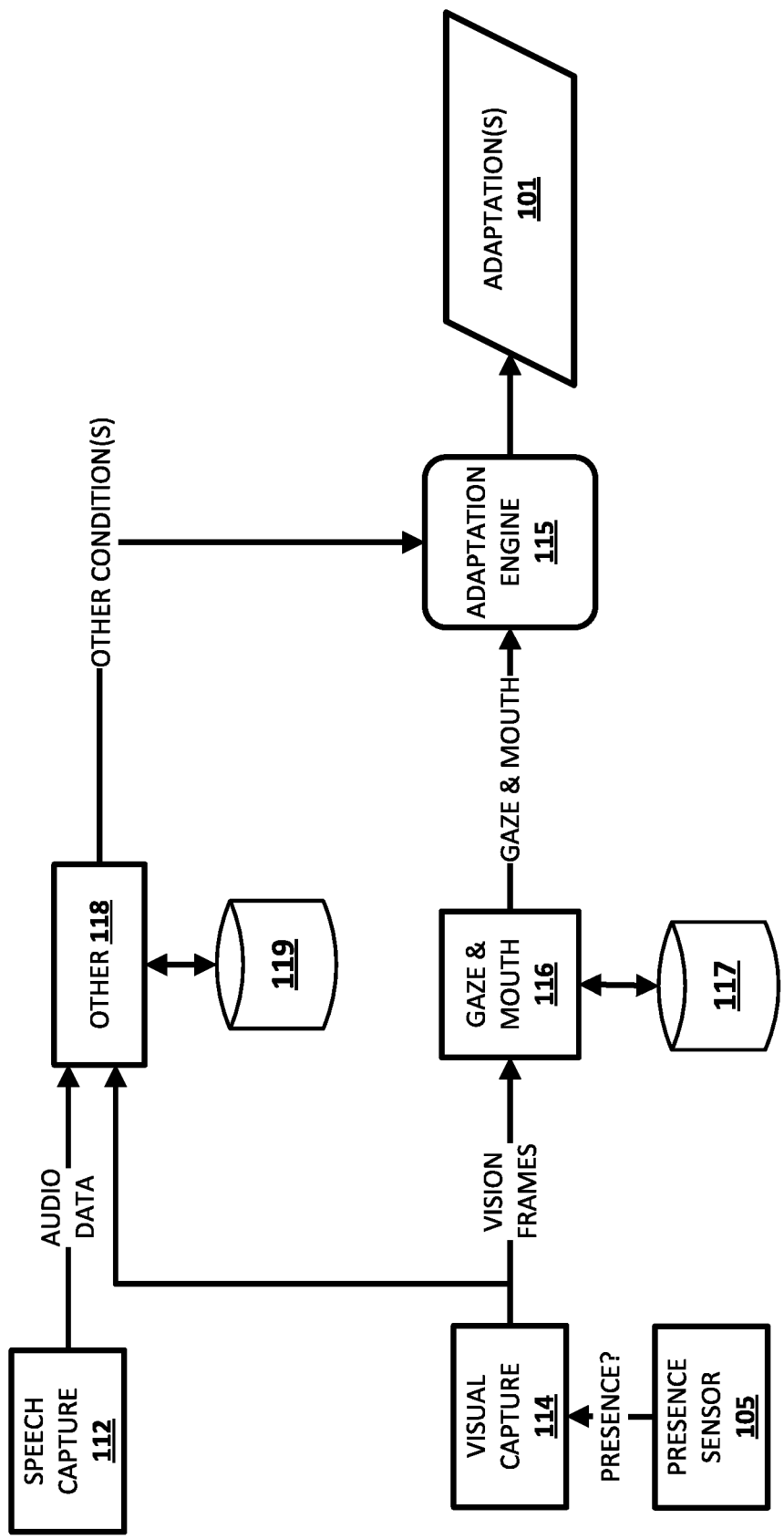
FIGS. 2A and 2B depict example process flows that demonstrate various aspects of the present disclosure, in accordance with various implementations.
Figure 2B:
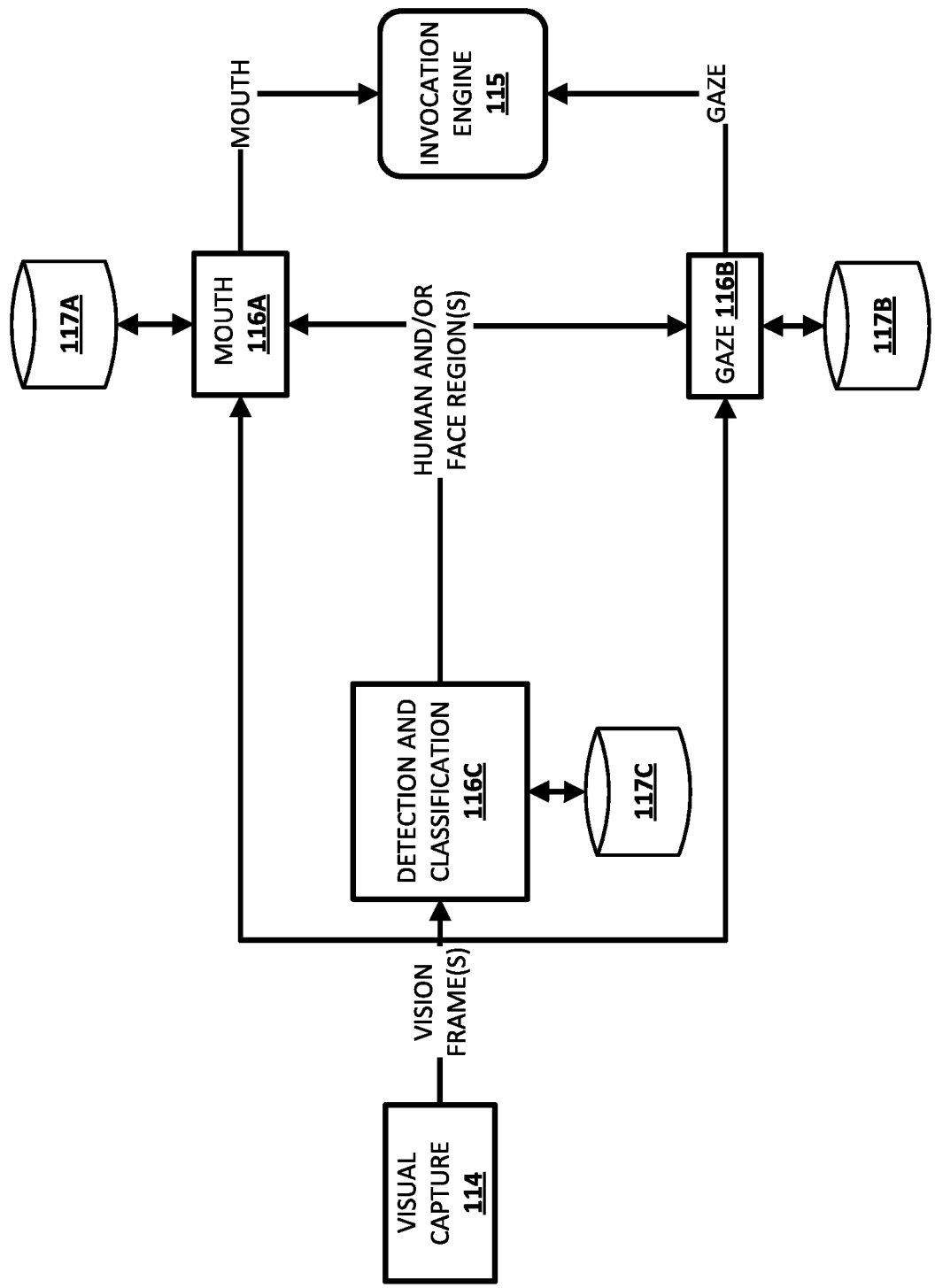

Referring now to FIGS. 2A and 2B, various examples are depicted of how gaze and mouth module 116 can detect a particular mouth movement and/or a directed gaze, and how adaptation engine 115 can adapt an automated assistant in response.

Turning initially to FIG. 2A, visual capture module 114 provides vision frames to gaze and mouth module 116. In some implementations, visual capture module 114 provides a real-time stream of vision frames to the gaze and mouth module 116. In some of those implementations, the visual capture module 114 begins providing the vision frames in response to signals from a separate presence sensor 105 indicating that a human is present in the environment with the client device 106. For example, the presence sensor 105 can be PIR sensor and can provide a signal to visual capture module 114 in response to detecting human presence. Visual capture module 114 may refrain from providing any vision frames to gaze and mouth module 116 unless human presence is detected. In other implementations where visual capture module 114 only selectively provides vision frames to the gaze and mouth module 116, additional and/or alternative cues can be utilized to initiate such provisioning. For example, human presence can be detected based on audio data from speech capture module 112, based on analysis of vision frames by one or more other components, and/or other signals.

The gaze and mouth module 116 processes the vision frames using one or more machine learning models 117 to monitor for the occurrence of both a directed gaze and a mouth movement. When both the directed gaze and the mouth movement are detected, the gaze and mouth module 116 provides an indication of detection of the gaze and mouth movement to adaptation engine 115.

In FIG. 2A, the vision frames and/or audio data (provided by speech capture module 112) are also provided to other conditions module 118. The other conditions module 118 processes the provided data, optionally using one or more other machine learning models 119, to monitor for occurrence of one or more other conditions. For example, the other conditions can be detecting any voice activity based on the audio data; detecting presence of a spoken invocation phrase in the audio data; detecting, based on the audio data, voice activity that is from a direction or position of the user; detecting, based on the vision frame(s) and/or the audio data that the user is an authorized user; detecting, based on the vision frames, a gesture of the user (that provided the mouth movement and the directed gaze); etc. When the other condition(s) are detected, the other conditions module 118 provides an indication of the occurrence of the other conditions to adaptation engine 115.

When the adaptation engine 115 receives an indication of the directed gaze and mouth movement, and a temporally proximate indication of the other conditions, the adaptation engine 115 causes adaptation(s) 101 of the automated assistant 120. For example, the adaptation(s) 101 can include adapting rendering of user interface output of the client device 106 and/or adapting audio data processing by the client device 106.

In some implementations, and as described in more detail with respect to FIG. 2B, the gaze and mouth module 116 can use one or more first machine learning models 117 for detecting a directed gaze, and one or more second machine learning models 117 for detecting mouth movement. In some other implementations, the gaze and mouth module 116 can utilize an end-to-end machine learning model that accepts, as input, vision frames (or features thereof) and that can be utilized to generate (based on processing of the input over the model) output that indicates whether mouth movement and a directed gaze have occurred. Such a machine learning model can be, for example, a neural network model, such as a recurrent neural network (RNN) model that includes one or more memory layers (e.g., long short-term memory (LSTM) layer(s)). Training of such an RNN model can be based on training examples that include, as training example input, a sequence of vision frames (e.g., a video) and, as training example output, an indication of whether the sequence includes both mouth movement and a directed gaze. For example, the training example output can include one or more values that each indicate whether both the mouth movement and directed gaze are present. For instance, the training example output can include a sequence of values, with each of the values of the sequence being for a corresponding one of the vision frames.

FIG. 2B illustrates an example where mouth movement and gaze detection module 116 includes a mouth module 116A that utilizes a mouth machine learning model 117A in monitoring for occurrence of mouth movement, and includes a gaze module 116B that utilizes a gaze machine learning model 117B in monitoring for occurrence of a directed gaze. Other condition(s) module 118 is not illustrated in FIG. 2B for simplicity, but can also optionally be utilized in combination with mouth module 116A and gaze module 116B in a similar manner as described with respect to FIG. 2A.

In FIG. 2B, visual capture module 114 provides vision frames to detection and classification module 116C. Detection and classification module 116C utilizes an object detection and classification machine learning model 117C to classify various regions of each vision frame. For example, detection and classification module 116C can classify human region(s) (if any) of each vision frame that corresponds to a human and provide an indication of such human region(s), for each vision frame, to mouth module 116A and gaze module 116B. Also, for example, detection and classification module 116C can classify region(s) (if any) of each vision frame that corresponds to face region(s), for each vision frame, to mouth module 116A and gaze module 116B. Also, for example, detection and classification module 116C can classify region(s) (if any) of each vision frame that corresponds to eye region(s) of a human and provide an indication of such region(s), for each vision frame, to gaze module 116B. As yet another example, detection and classification module 116C can classify region(s) (if any) of each vision frame that corresponds to mouth region(s) of a human and provide an indication of such region(s), for each vision frame, to mouth module 116A.

In some implementations, the mouth module 116A can utilize the provided region(s) to process only corresponding portion(s) of each vision frame. For example, the mouth module 116A can "crop" and resize the vision frames to process only those portion(s) that include human region(s), or face region(s), or mouth region(s). In some of those implementations, the mouth machine learning model(s) 117A can be trained based on vision frames that are "cropped" and the resizing can be to a size that conforms to input dimensions of such a model. In some additional or alternative implementations, the mouth module 116A can utilize the provided region(s) to skip processing of some vision frames all together (e.g., those indicated as not including human and/or face regions). In yet other implementations, the mouth module 116A can utilize the provided region(s) as an attention mechanism (e.g., as a separate attention input to the mouth machine learning model 117A) to focus the processing of each vision frame.

Likewise, in some implementations, the gaze module 116B can utilize the provided region(s) to process only corresponding portion(s) of each vision frame. For example, the gaze module 116B can "crop" and resize the vision frames to process only those portion(s) that include human region(s), or face region(s), or eye region(s). In some of those implementations, the gaze machine learning model 117B can be trained based on vision frames that are "cropped" and the resizing can be to a size that conforms to input dimensions of such a model. In some additional or alternative implementations, the gaze module 116B can utilize the provided region(s) to skip processing of some vision frames all together (e.g., those indicated as not including human and/or face regions). In yet other implementations, the gaze module 116B can utilize the provided region(s) as an attention mechanism (e.g., as a separate attention input to the gaze machine learning model 117B) to focus the processing of each vision frame.

In some implementations, detection and classification model 116C can additionally or alternatively provide indications of certain region(s) to other conditions module 118 (not depicted in FIG. 2B for simplicity) for use by other conditions module 118. For example, body region(s) can be used by other conditions module 118 in detecting gestures utilizing a corresponding gesture machine learning model, when detection of a gesture is an additional condition for adapting the automated assistant.

In some implementations, detection and classification model 116C can additionally or alternatively provide, to mouth module 116A and gaze module 116B, indications of region(s) that are classified as TVs or other video display sources. In some of those implementations, the modules 116A and 116B can crop those region(s) out of processed vision frames, focus attention away from those regions, and/or otherwise ignore those regions in detections or lessen the chances that detections will be based on such regions. In these and other manners, false-positive adaptation(s) of an automated assistant can be mitigated.

As mentioned above, the mouth module 116A can use one or more mouth machine learning models 117A for detecting a mouth movement. Such a machine learning model can be, for example, a neural network model, such as a RNN model that includes one or more memory layers. Training of such an RNN model can be based on training examples that include, as training example input, a sequence of vision frames (e.g., a video) and, as training example output, an indication of whether the sequence includes one or more particular mouth movements. For example, the training example output can be a single value that indicates whether any mouth movement is present that is indicative of a corresponding user speaking. For instance, the single value can be a "0" when no mouth movement is present and a "1" when mouth movement indicative of a user speaking is present. For example, the training example output can include one or more values that each indicate whether any mouth movement is present that is indicative of a corresponding user speaking. For instance, the training example output can include a sequence of values, with each of the values of the sequence being for a corresponding one of the vision frames (e.g., when the model being trained is a sequence-to-sequence model). The values can be, for example, a "0" when no mouth movement is present and a "1" when mouth movement indicative of a user speaking is present. As another example, the training example output can include a single value for a sequence of vision frames, where the single value indicates whether any mouth movement is present that is indicative of a corresponding user speaking.

In some of those and/or other implementations, the mouth module 116A determines mouth movement only when mouth movement is detected with at least a threshold probability and/or for at least a threshold duration. For example, a stream of image frames can be processed using a sequence-to-sequence RNN model and processing each frame can result in a corresponding probability that mouth movement is occurring (which, due to the recurrent nature of the network can be based on prior frame(s)). The mouth movement module can determine there is mouth movement only if at least X % of a sequence of image frames (that corresponds to the threshold duration) has a corresponding probability that satisfies a threshold. For instance, assume X % is 60%, the probability threshold is 0.6, and the threshold duration is 0.25 seconds. Further assume 5 image frames correspond to 0.5 seconds. If the image frames are processed to generate probabilities of [0.75, 0.85, 0.5, 0.7, 0.9], mouth movement can be detected since 80% of the frames indicated mouth movement with a probability that is greater than 0.7. Additional and/or alternative machine learning models and/or techniques can be utilized to detect mouth movement.

The gaze module 116A can use one or more gaze machine learning models 117A for detecting a directed gaze. Such a machine learning model can be, for example, a neural network model, such as a convolutional neural network (CNN) model. Training of such a CNN model can be based on training examples that include, as training example input, a vision frames (e.g., an image) and, as training example output, an indication of whether the image includes a directed gaze. For example, the training example output can be a single value that indicates whether directed gaze is present. For example, the single value can be a "0" when no directed gaze is present, a "1" when a gaze is present that is directed directly at, or within 5 degrees of, a sensor that captures the image, a "0.75" when a gaze is present that is directed within 5-10 degrees of a sensor that captures the image, etc.

In some of those and/or other implementations, the gaze module 116B determines a directed gaze only when a directed gaze is detected with at least a threshold probability and/or for at least a threshold duration. For example, a stream of image frames can be processed using the CNN model and processing each frame can result in a corresponding probability that the frame includes a directed gaze. The gaze module can determine there is a directed gaze only if at least X % of a sequence of image frames (that corresponds to the threshold duration) has a corresponding probability that satisfies a threshold. For instance, assume X % is 60%, the probability threshold is 0.7, and the threshold duration is 0.5 seconds. Further assume 10 image frames correspond to 0.5 seconds. If the image frames are processed to generate probabilities of [0.75, 0.85, 0.5, 0.4, 0.9, 0.95, 0.85, 0.89, 0.6, 0.85], a directed gaze can be detected since 70% of the frames indicated a directed gaze with a probability that is greater than 0.7. In these and other manners, even when a user briefly diverts his/her gaze direction, a directed gaze can be detected. Additional and/or alternative machine learning models (e.g., RNN models) and/or techniques can be utilized to detect a directed gaze that occurs with at least a threshold duration.

Figure 3:
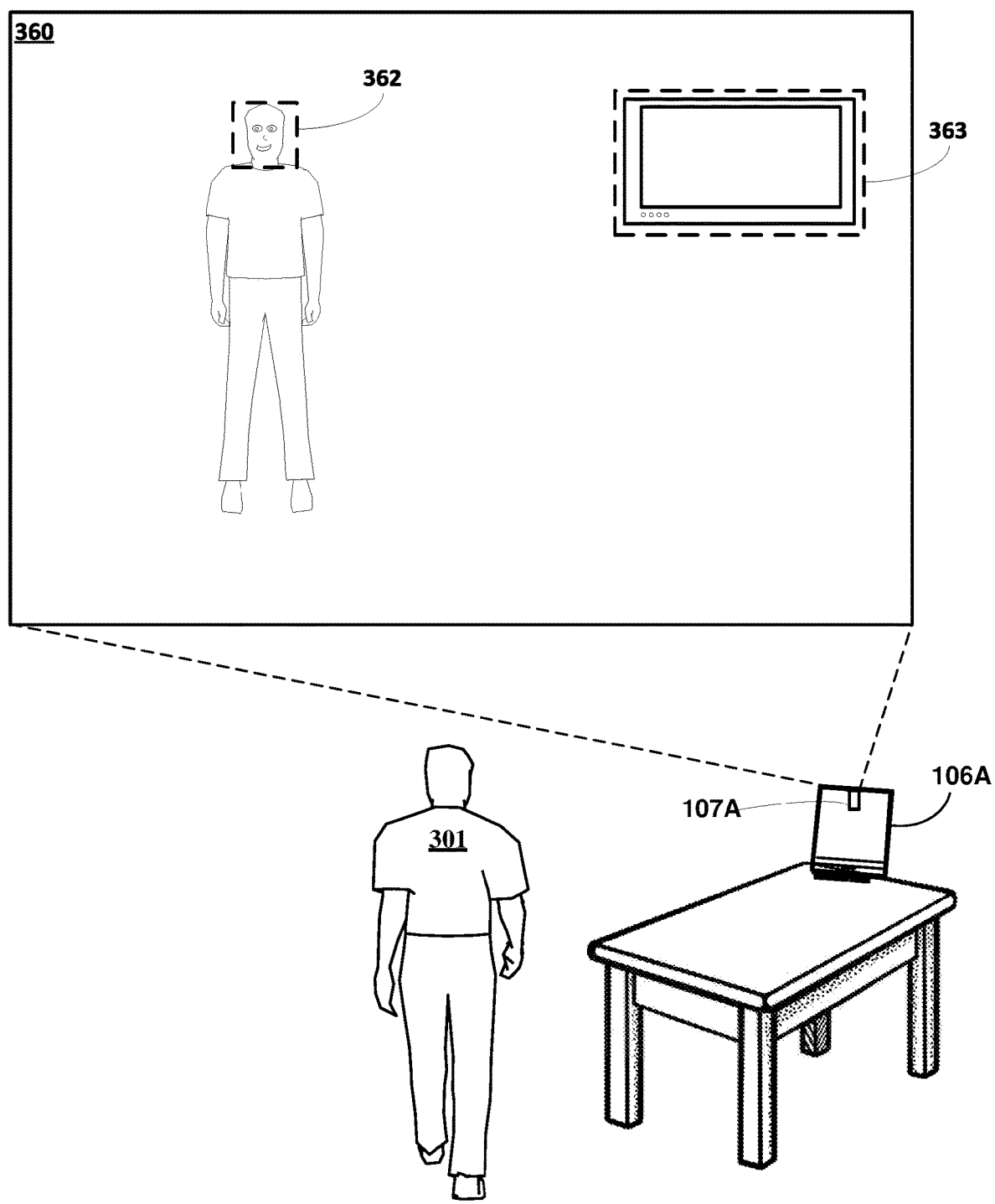
FIG. 3 depicts an example of an assistant device and a user providing a directed gaze and speaking (thereby causing mouth movement), and also depicts an image captured by a camera of the assistant device when the user is providing the directed gaze and speaking.

FIG. 3 depicts an example of client device 106 and vision component 107 of FIG. 1. In FIG. 3, the example client device is denoted as 106A and further includes speaker(s) and a display. In FIG. 3, the example vision component is denoted as 107A and is a camera. FIG. 3 also depicts a user 301 who is speaking (not depicted) and providing a gaze that is directed to the camera 107A. FIG. 3 also depicts an example image 360 captured by the camera 107A when the user is speaking and providing a directed gaze. It can be seen that the user is captured in the image 360, as well as a television that is behind the user (and thus not visible in the perspective view of FIG. 3).

In image 360, a bounding box 362 is provided and represents a region of the image that can be determined (e.g., by detection and classification module 116C of FIG. 2B) to correspond to a face. In some implementations, a gaze and mouth movement module operating on client device 106A can process only that portion of the image (or focus attention on that portion) in monitoring for a directed gaze and mouth movement, based on that portion being indicated as a portion that corresponds to a face. Although only a single image is depicted in FIG. 3, in various implementations directed gaze detection and/or mouth movement detection can be based on a sequence of images as described herein.

In image 360, a bounding box 363 is also provided and represents a region of the image that can be determined to correspond to a video display and that might raise false positives of visual cues. For example, the television might render video showing one or more individuals talking, looking into the camera, etc., any of which could be misinterpreted as occurrence of mouth movement and/or directed gaze. In some implementations, detection and classification module 116C of FIG. 2B can determine such a region (e.g., based on detecting a TV classification) and/or such a region can be determined based on analysis of image 360 and preceding images to determine the region has a display frequency that corresponds to a display frequency of a video display (e.g., approximately 60 Hz, 120 Hz, and/or other typical video display frequency). In some implementations, a mouth movement module and/or gaze module can crop that region out of processed vision frames, focus attention away from that region, and/or otherwise ignore that region in detections or lessen the chances that detections will be based on such regions. In these and other manners, false-positive adaptation(s) of an automated assistant can be mitigated.

Figure 4A:
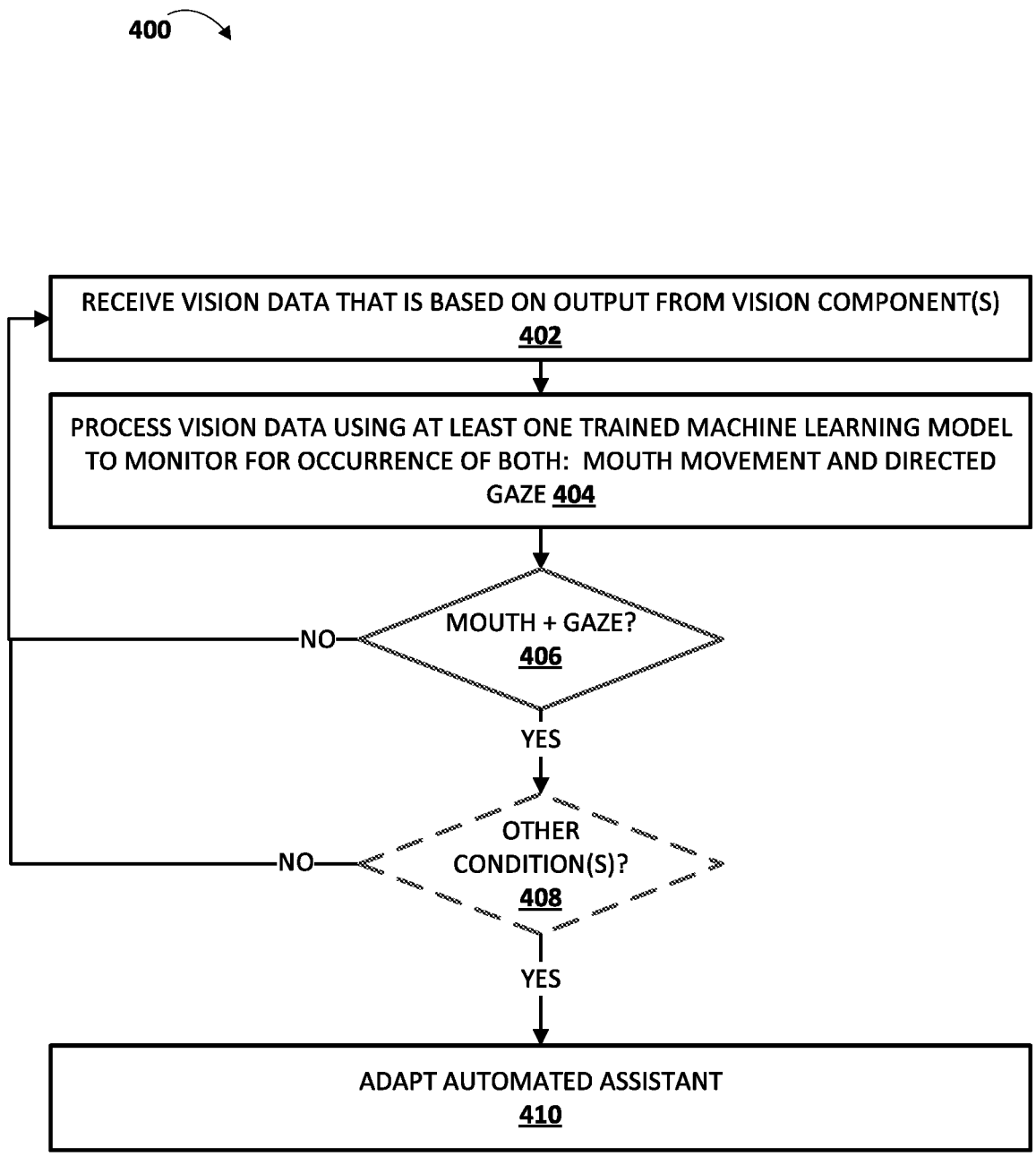
FIG. 4A depicts a flowchart illustrating an example method according to implementations disclosed herein.

FIG. 4A is a flowchart illustrating an example method 400 according to implementations disclosed herein. FIGS. 4B, 4C, 4D, and 4E are each a flowchart illustrating a different example of implementations of block 410 of FIG. 4A. For convenience, the operations of the flow charts of FIGS. 4A-4D are described with reference to a system that performs the operations. This system may include various components of various computer systems, such as one or more components of computing system(s) that implement automated assistant 120 (e.g., a client device and/or remote computing system(s)). Moreover, while operations of method 400 are shown in a particular order, this is not meant to be limiting. One or more operations may be reordered, omitted or added.

At block 402, the system receives vision data that is based on output from vision component(s). In some implementations, the vision component(s) can be integrated with a client device that includes an assistant client. In some implementations, the vision component(s) can be separate from, but in communication with, the client device. For example, the vision component(s) can include a stand-alone smart camera that is in wired and/or wireless communication with a client device that includes an assistant client.

At block 404, the system processes vision data using at least one machine learning model, to monitor for occurrence of both: mouth movement and a directed gaze.

At block 406, the system determines whether both mouth movement and a directed gaze have been detected based on the monitoring of block 404. If not, the system proceeds back to block 402, receives additional vision data, and performs another iteration of blocks 404 and 406. In some implementations, the system determines both mouth movement and a directed gaze have been detected based on detecting mouth movement and directed gaze co-occur or occur within a threshold temporal proximity of one another. In some additional or alternative implementations, the system determines both mouth movement and a directed gaze have been detected based on detecting the mouth movement is of at least a threshold duration and/or the directed gaze is of at least a threshold duration (which can be that same or different from that optionally used for the mouth movement duration). As described herein, the system can utilize one or more machine learning models in performing block 406.

If, at an iteration of block 406, the system determines that both mouth movement and a gaze have been detected based on the monitoring of block 404, the system optionally proceeds to block 408 (or, when block 408 is not included, directly to block 410).

At optional block 408, the system determines whether one or more other conditions are satisfied. If not, the system proceeds back to block 402, receives additional vision data, and performs another iteration of blocks 404, 406, and 408. If so, the system proceeds to block 410. The system can determine whether one or more other conditions are satisfied using the vision data received at block 402, audio data, and/or other sensor or non-sensor data. Various other condition(s) can be considered by the system, such as those explicitly described herein.

At block 410, the system adapts an automated assistant. The system can adapt the automated assistant in various manners, such as one or more of those described below with respect to FIGS. 4B-4D.

Figure 4B:
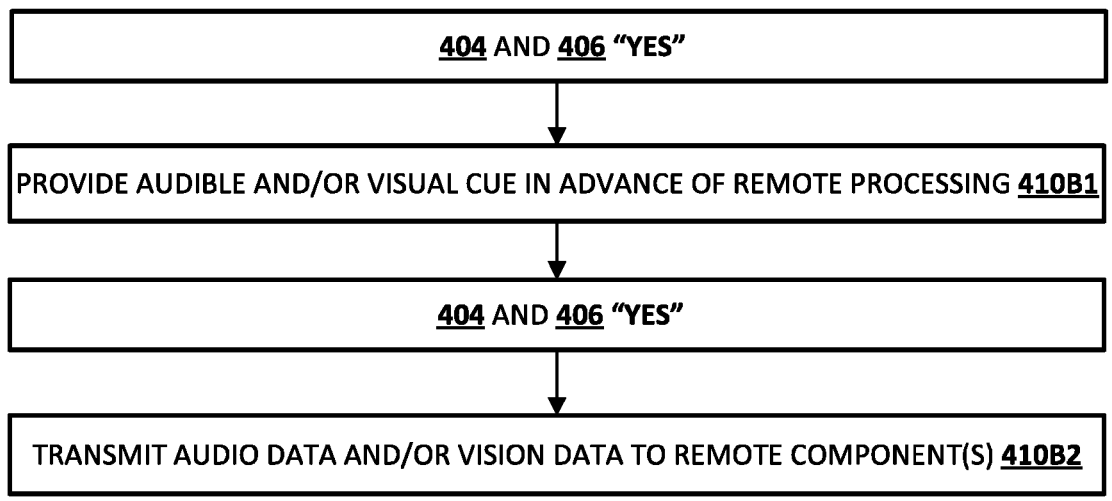
FIGS. 4B, 4C, 4D, and 4E each depict a flowchart illustrating a particular example of certain blocks of the example method of FIG. 4A.
Figure 4C:
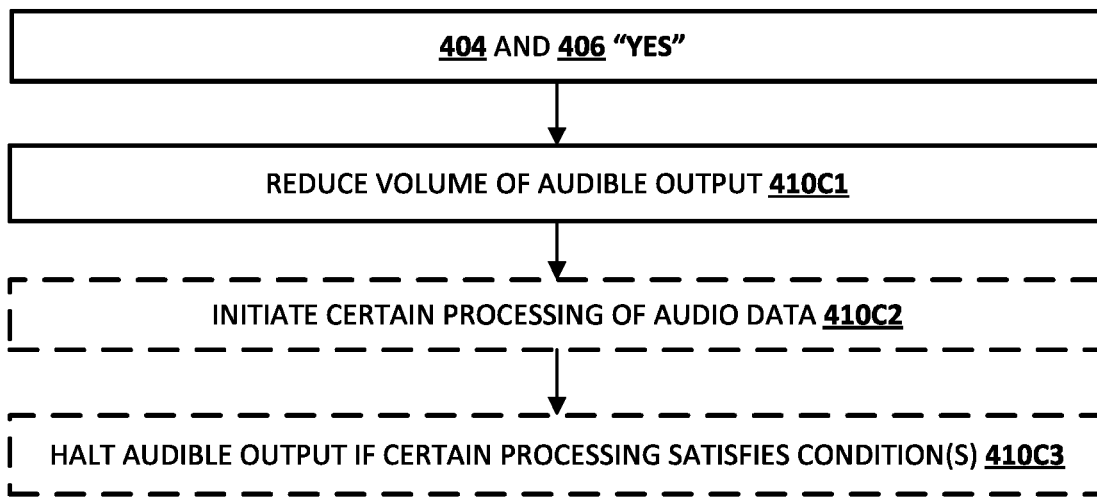
Figure 4D:
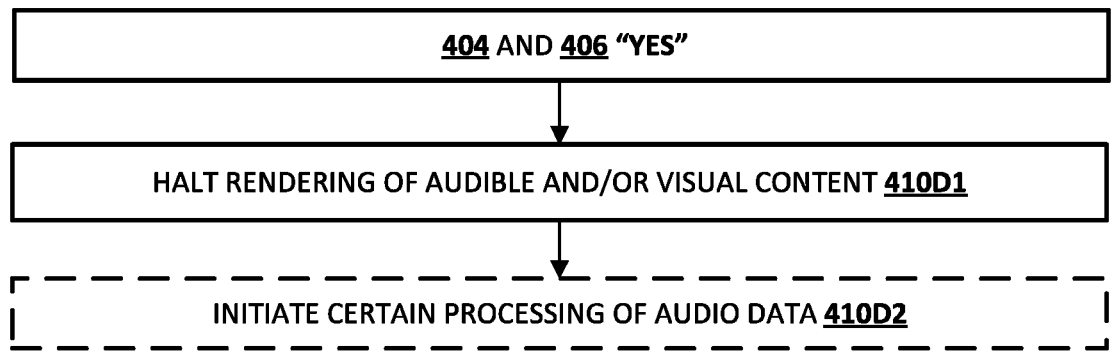

Turning now to FIGS. 4B-4D, various examples of implementations of block 410 of FIG. 4A is illustrated. Turning initially to FIG. 4B, an initial iteration 410B1 of an example of block 410 is performed in response to "yes" determinations at blocks 404 and 406 of FIG. 4A. At iteration 410B1, the system provides an audible and/or visual cue in advance of providing sensor data (e.g., vision data and/or audio data) for remote processing. The rendering of the cue can indicate (directly or indirectly) that the remote processing of audio data and/or vision data is about to occur. Various human perceptible cues can be rendered, such as an audible "ding" and/or an illumination of light emitting diode(s) of the assistant device.

After iteration 410B1, further iterations of blocks 402, 404, and 406 (FIG. 4A) are performed and, as indicated in FIG. 4B, further "yes" determinations are made at blocks 404 and 406. The further "yes" determinations indicate that the user has continued to speak and direct his/her gaze at the client device. In response to the further "yes" determinations, an additional iteration 410B2 of an example of block 410 is performed. At iteration 410B2, the system transmits audio data and/or vision data to remote component(s) for remote processing. Had the further "yes" determinations not been made, the further adapting of iteration 410B2 would not have occurred. For example, had the user diverted his/her gaze and/or stopped speaking, "no" determinations would have been made and the further adapting of iteration 410B2 prevented.

Turning now to FIG. 4C, an example 410C1 of block 410 is performed in response to "yes" determinations at blocks 404 and 406 of FIG. 4A. At block 410C1, the system reduces the volume of audible output that is being rendered when the "yes" determinations at blocks 404 and 406 are made. In some implementations, further example blocks 410C2 and optionally 410C3 of block 410 are also performed. At block 410C2, the system initiates certain processing of audio data. Block 410C2 can be performed in response to the "yes" determinations at blocks 404 and 406 of FIG. 4A and can include certain processing of audio data that is buffered and/or that is streaming. The certain processing can include, for example, voice activity detection, invocation phrase detection, and/or other processing. At block 410C3, the system halts the audible output if the certain processing of FIG. 410C2 satisfies one or more conditions. For example, the system can halt the audible processing if voice activity detection of FIG. 410C2 indicates that a spoken utterance of a user is present in the processed audio data, and/or if processing indicates a spoken utterance is present and originates from a direction of the user corresponding to the mouth movement and directed gaze.

Turning now to FIG. 4D, an example 410D1 of block 410 is performed in response to "yes" determinations at blocks 404 and 406 of FIG. 4A. At block 410D1, the system halts audible output that is being rendered when the "yes" determinations at blocks 404 and 406 are made. In some implementations, further example block 410D2 of block 410 is also performed. At block 410D2, the system initiates certain processing of audio data. Block 410D2 can be performed in response to the "yes" determinations at blocks 404 and 406 of FIG. 4A and can include certain processing of audio data that is buffered and/or that is streaming. The certain processing can include, for example, voice activity detection, invocation phrase detection, the transmission of the audio data to remote component(s) for further processing, and/or other processing.

Figure 4E:
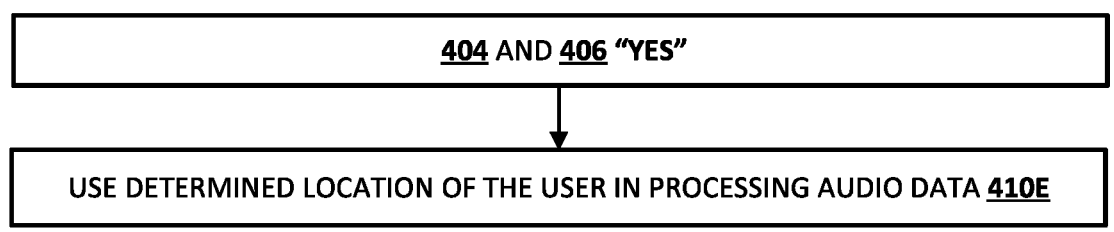

Turning now to FIG. 4E, an example 410E of block 410 is performed in response to "yes" determinations at blocks 404 and 406 of FIG. 4A. At block 410E, the system uses a determined location of the user in processing audio data, in response to the "yes" determinations being made at blocks 404 and 406 are made. In some implementations, further example block 410D2 of block 410 is also performed. The position of the user can be relative to the client device and can be determined, for example, by the system based on portions of vision data determined to correspond to the user. The position of the user can be determined and used in the processing based on the user corresponding to the detected mouth movement and directed gaze (which can indicate the user is attempting to audibly interact with the system). The processing of the audio data based on the position of the user can include, for example, isolating portions of the audio data that correspond to a spoken utterance and/or removing background noise from the audio data. Such processing can rely on the determined position and beamforming and/or other techniques in isolating the portions of the audio data and/or removing background noise from the audio data.

Although FIGS. 4A-4E are illustrated separately, it is noted that in various implementations, example blocks of multiple of FIGS. 4A-4E can be performed in response to detecting occurrence of mouth movement and directed gaze. As one example, in response to "yes" determinations at blocks 404 and 406 of FIG. 4A, blocks 410C1 and 410C2 of FIG. 4C can be performed, and block 410C2 can include the processing of block 410E of FIG. 4E. As another example, in response to initial "yes" determinations at blocks 404 and 406 of FIG. 4A, block 410B1 of FIG. 4B can be performed, in response to additional "yes" determinations block 410B2 can be performed, and the remote component(s) can perform the processing of block 410E of FIG. 4E.

Various examples are described herein of adapting an automated assistant in response to detecting both mouth movement and a directed gaze. However, in various implementations an automated assistant can be adapted in response to detecting only one of: mouth movement, and a directed gaze, optionally in combination with one or more other conditions, such as those described herein. For example, in some of those various implementations, an automated assistant can be adapted in response to detecting a directed gaze of a user that is of at least a threshold duration, along with co-occurring other condition(s) such as a gesture of the user. Also, for example, in some of those various implementations, an automated assistant can be adapted in response to detecting mouth movement of a user, along with co-occurring and/or temporally proximal other condition(s) such as a gesture of the user and/or detected voice activity.

Figure 5:
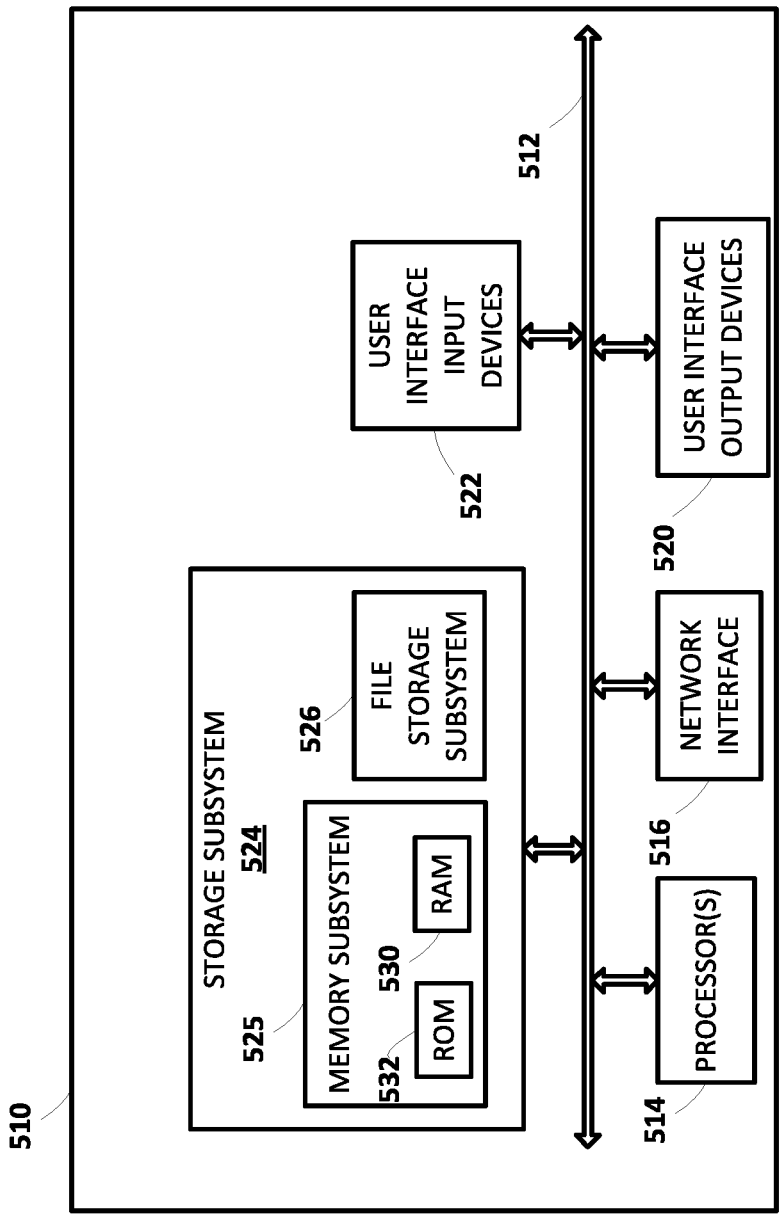
FIG. 5 illustrates an example architecture of a computing device.

FIG. 5 is a block diagram of an example computing device 510 that may optionally be utilized to perform one or more aspects of techniques described herein. In some implementations, one or more of a client computing device, user-controlled resources module 130, and/or other component(s) may comprise one or more components of the example computing device 510.

Computing device 510 typically includes at least one processor 514 which communicates with a number of peripheral devices via bus subsystem 512. These peripheral devices may include a storage subsystem 524, including, for example, a memory subsystem 525 and a file storage subsystem 526, user interface output devices 520, user interface input devices 522, and a network interface subsystem 516. The input and output devices allow user interaction with computing device 510. Network interface subsystem 516 provides an interface to outside networks and is coupled to corresponding interface devices in other computing devices.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 510 to the user or to another machine or computing device.

Storage subsystem 524 stores programming and data constructs that provide the functionality of some or all of the modules described herein. For example, the storage subsystem 524 may include the logic to perform selected aspects of the method of FIGS. 4A-4D, as well as to implement various components depicted in FIGS. 1, 2A-2B, and 3.

These software modules are generally executed by processor 514 alone or in combination with other processors. Memory 525 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computing device 510 communicate with each other as intended. Although bus subsystem 512 is shown schematically as a single bus, alternative implementations of the bus subsystem may use multiple busses.

Computing device 510 can be of varying types including a workstation, server, computing cluster, blade server, server farm, or any other data processing system or computing device. Due to the ever-changing nature of computers and networks, the description of computing device 510 depicted in FIG. 5 is intended only as a specific example for purposes of illustrating some implementations. Many other configurations of computing device 510 are possible having more or fewer components than the computing device depicted in FIG. 5.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used. For example, in some implementations, users may opt out of assistant devices using vision component 107 and/or using vision data from vision component 107 in monitoring for occurrence of mouth movement and/or directed gazes.

What is claimed is:

1. A method implemented by one or more processors of a client device that facilitates touch-free interaction between one or more users and an automated assistant, the method comprising:
   receiving a stream of image frames that are based on output from one or more cameras of the client device;
   processing the image frames of the stream using at least one trained machine learning model stored locally on the client device to monitor for occurrence of both:
   a gaze of a user that is directed toward the one or more cameras of the client device, and
   movement of a mouth of the user;
   detecting, based on the monitoring, occurrence of both:
   the gaze of the user, and
   the movement of the mouth of the user; and
   in response to detecting the occurrence of both the gaze of the user and the movement of the mouth of the user, adapting rendering of user interface output of the client device, wherein adapting rendering of user interface output of the client device comprises:
   reducing a volume of rendering of audible user interface output rendered by the client device, or
   halting the rendering of the audible user interface output rendered by the client device.

2. The method of claim 1, wherein adapting audio data processing by the client device is also performed in response to detecting the occurrence of both the gaze of the user and the movement of the mouth of the user.

3. The method of claim 1, wherein adapting rendering of user interface output of the client device comprises:
reducing the volume of rendering of the audible user interface output rendered by the client device.

4. The method of claim 3, further comprising:
performing voice activity detection of audio data that temporally corresponds with the movement of the mouth of the user;
determining occurrence of voice activity based on the voice activity detection of the audio data that temporally corresponds to the mouth movement of the user;
wherein reducing the volume of the audible user interface output rendered by the client device is further in response to determining the occurrence of voice activity, and based on the occurrence of the voice activity being for the audio data that temporally corresponds to the mouth movement of the user.

5. The method of claim 1, wherein adapting rendering of user interface output of the client device comprises:
halting the rendering of the audible user interface output rendered by the client device.

6. The method of claim 5, further comprising:
performing voice activity detection of audio data that temporally corresponds with the movement of the mouth of the user;
determining occurrence of voice activity based on the voice activity detection of the audio data that temporally corresponds to the mouth movement of the user;
wherein halting the rendering of the audible user interface output rendered by the client device is further in response to determining the occurrence of voice activity, and based on the occurrence of the voice activity being for the audio data that temporally corresponds to the mouth movement of the user.

7. The method of claim 2,
wherein adapting rendering of user interface output of the client device further comprises rendering a human perceptible cue;
wherein adapting the audio data processing by the client device comprises initiating local automatic speech recognition at the client device, or initiating transmission of audio data, captured via one or more microphones of the client device, to a remote server associated with the automated assistant; and
wherein initiating the local automatic speech recognition or initiating the transmission of audio data to the remote server is further in response to detecting the gaze of the user continues to be directed toward the one or more cameras of the client device following the rendering of the cue.

8. The method of claim 2, wherein adapting audio data processing by the client device comprises initiating local automatic speech recognition at the client device.

9. The method of claim 2, wherein adapting the audio data processing by the client device comprises initiating the transmission of audio data, captured via one or more microphones of the client device, to a remote server associated with the automated assistant.

10. The method of claim 9, further comprising:
performing voice activity analysis of certain audio data that temporally corresponds with the movement of the mouth of the user, the certain audio data being included in the audio data or preceding the audio data; and
determining occurrence of voice activity based on the voice activity analysis of the certain audio data that temporally corresponds to the mouth movement of the user;
wherein initiating the transmission of audio data is further in response to determining the occurrence of voice activity, and based on the occurrence of the voice activity being for the audio data that temporally corresponds to the mouth movement of the user.

11. The method of claim 2, wherein adapting the audio data processing by the client device in response to detecting the occurrence of both the gaze of the user and the movement of the mouth of the user comprises:
determining a position of the user, relative to the client device, based one or more of the image frames;
using the position of the user in processing of audio data captured via one or more microphones of the client device.

12. The method of claim 11, wherein using the position of the user in processing of audio data captured via one or more microphones of the client device comprises using the position in isolating portions of the audio data that correspond to a spoken utterance of the user.

13. The method of claim 11, wherein using the position of the user in processing of audio data captured via one or more microphones of the client device comprises using the position in removing background noise from the audio data.

14. The method of claim 1, wherein processing the image frames of the stream using at least one trained machine learning model stored locally on the client device to monitor for occurrence of both the gaze of the user and the movement of the mouth of the user comprises:
using a first trained machine learning model to monitor for occurrence of the gaze of the user; and
using a second trained machine learning model to monitor for the movement of the mouth of the user.

15. The method of claim 1, further comprising:
detecting, based on a signal from a presence sensor, that a human is present in an environment of the client device; and
causing the one or more cameras to provide the stream of image frames in response to detecting that the human is present in the environment.

16. A client device comprising:
at least one vision component;
at least one microphone;
one or more processors;
memory operably coupled with the one or more processors, wherein the memory stores instructions that, in response to execution of the instructions by one or more of the processors, cause one or more of the processors to perform the following operations:
receiving a stream of vision data that is based on output from the vision component of the client device;
processing the vision data of the stream using at least one trained machine learning model stored locally on the client device to monitor for occurrence of both:
a gaze of a user that is directed toward the vision component of the client device, and
movement of a mouth of the user;
detecting, based on the monitoring, occurrence of both:
the gaze of the user, and
the movement of the mouth of the user; and
in response to detecting the occurrence of both the gaze of the user and the movement of the mouth of the user:
adapting rendering of user interface output of the client device, wherein adapting rendering of user interface output of the client device comprises:
reducing a volume of rendering of audible user interface output rendered by the client device, or halting the rendering of the audible user interface output rendered by the client device.

17. A system, comprising:
at least one vision component;
one or more microphones;
one or more processors receiving a stream of vision data that is based on output from the vision component, wherein one or more of the processors are configured to:
   process the vision data of the stream using at least one trained machine learning model to monitor for occurrence of both:
     a gaze of a user that is directed toward the vision component, and
     movement of a mouth of the user;
   detect, based on the monitoring, occurrence of both:
     the gaze of the user, and
     the movement of the mouth of the user; and
   in response to detecting the occurrence of both the gaze of the user and the movement of the mouth of the user, adapt rendering of user interface output of the client device, wherein adapting rendering of user interface output of the client device comprises:
     reducing a volume of rendering of audible user interface output rendered by the client device, or
     halting the rendering of the audible user interface output rendered by the client device.

18. The method of claim 1, wherein detecting the occurrence of both the gaze of the user and the movement of the mouth of the user comprises:
   detecting co-occurrence of the gaze of the user and the movement of the mouth of the user, or
   detecting occurrence of the gaze of the user and the movement of the mouth of the user within a threshold temporal proximity of one another.

19. The client device of claim 16, wherein detecting the occurrence of both the gaze of the user and the movement of the mouth of the user comprises:
   detecting co-occurrence of the gaze of the user and the movement of the mouth of the user, or
   detecting occurrence of the gaze of the user and the movement of the mouth of the user within a threshold temporal proximity of one another.

20. The system of claim 17, wherein in detecting the occurrence of both the gaze of the user and the movement of the mouth of the user one or more of the processors are configured to:
   detect co-occurrence of the gaze of the user and the movement of the mouth of the user, or
   detect occurrence of the gaze of the user and the movement of the mouth of the user within a threshold temporal proximity of one another.

* * * * *